US011284258B1

(12) United States Patent
Wei et al.

(10) Patent No.: US 11,284,258 B1
(45) Date of Patent: Mar. 22, 2022

(54) MANAGING ACCESS OF A COMPUTING DEVICE TO A NETWORK

(71) Applicant: Amazon Technologies, Inc., Seattle, WA (US)

(72) Inventors: QingYun Wei, San Jose, CA (US); Andrew Roths, Kenmore, WA (US); Avinash Joshi, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 246 days.

(21) Appl. No.: 16/452,193

(22) Filed: Jun. 25, 2019

(51) Int. Cl.
*H04W 12/08* (2021.01)
*H04L 29/06* (2006.01)
*H04L 9/08* (2006.01)
*H04W 12/06* (2021.01)
*H04W 84/12* (2009.01)

(52) U.S. Cl.
CPC .......... *H04W 12/08* (2013.01); *H04L 9/0861* (2013.01); *H04L 63/083* (2013.01); *H04L 63/0876* (2013.01); *H04L 63/10* (2013.01); *H04L 63/18* (2013.01); *H04W 12/06* (2013.01); *H04W 84/12* (2013.01)

(58) Field of Classification Search
CPC ..... H04W 12/08; H04W 12/06; H04W 84/12; H04L 63/10; H04L 63/18; H04L 63/083; H04L 63/0876; H04L 9/0861
See application file for complete search history.

(56) References Cited

U.S. PATENT DOCUMENTS

| 2014/0086163 | A1* | 3/2014 | Yang | H04W 72/04 370/329 |
| 2015/0230280 | A1* | 8/2015 | Dees | H04W 12/04 455/39 |
| 2017/0359774 | A1* | 12/2017 | Lu | H04W 48/16 |

* cited by examiner

*Primary Examiner* — Khoi V Le
(74) *Attorney, Agent, or Firm* — Kilpatrick Townsend & Stockton LLP

(57) ABSTRACT

Techniques for connecting computing devices to a network are described. For example, a network access device (NAD) connects to a first network that includes a first access point (AP). The NAD receives, from a computing device, first data identifying a second network to be established for the computing device and sends the first data to a server. The NAD receives back a first credential associated with access to the second network and sets up a second AP to the second network. The second AP is associated with the first credential. The NAD sends, to the computing device, second data indicating that access to the second network is available, generates a second credential associated with access to the first network via the first AP, and sends the second credential to the computing device via the second AP.

20 Claims, 13 Drawing Sheets

MANAGING ACCESS OF A COMPUTING DEVICE TO A NETWORK

BACKGROUND

Most computing devices, such as consumer electronics, support wireless connectivity. Typically, a computing device connects to a wireless access point that provides access to a data network. In many cases, the data network is a secure home network that is accessible to the computing device based on a credential, such as a passphrase. In such cases, different techniques are available to create a secure wireless home network. For example, Wi-Fi Protected Access (WPA) is a network security protocol that allows a user to securely connect the computing device to the secure wireless home network via the wireless access point. The WPA technique and other connection techniques generally rely on user input at the computing device and/or the wireless access point to establish the connection.

BRIEF DESCRIPTION OF THE DRAWINGS

Various embodiments in accordance with the present disclosure will be described with reference to the drawings, in which.

DETAILED DESCRIPTION

Figure 1:
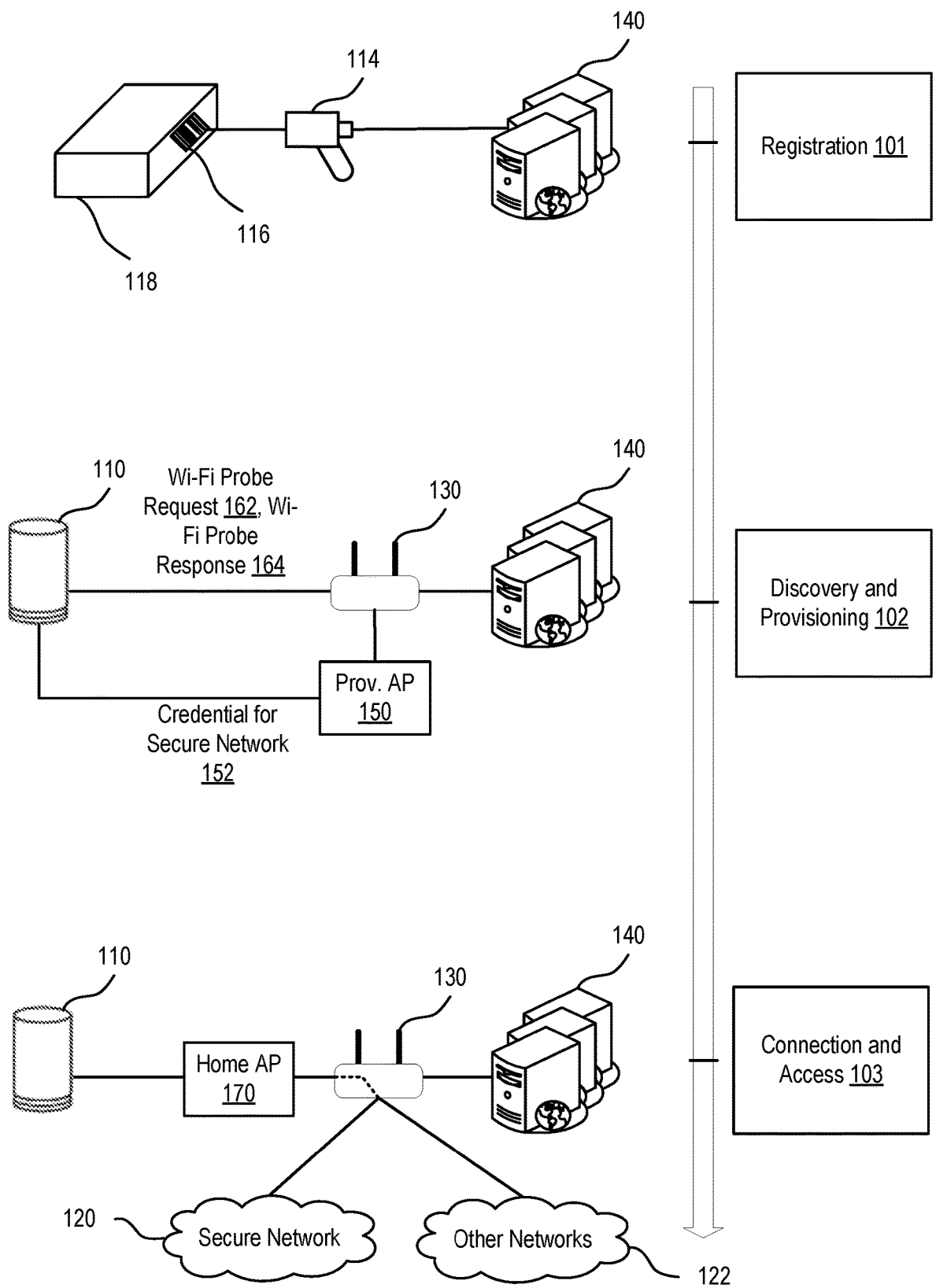
FIG. 1 illustrates an example of phases for connecting a computing device to a secure computer network via a smart hub, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, seamlessly and securely connecting computing devices to a secure computer network. In an example, the secure computer network includes a network access device and an access point (that may, but need not, be a component of the network access device). For clarity, this secure computer network is referred to as a first secure computer network and the access point as a first access point. The network access device manages access of the computing devices to the first secure computer network. For wireless access, the access is via the first access point. To connect a computing device to the secure computer network (e.g., to add the computing device to the network of already connected computing devices), the network access device sets up a second access point specifically for the computing device. Upon a connection between the computing device and the second access point, a second secure computer network is formed and includes the network access device, the second access point, and the computing device. Thereafter, the network access device generates a credential specific to the computing device and usable to access the first secure computer network via the first access point. The credential is sent to the computing device via the second access point. Upon receipt of the credential, the computing device disconnects from the second access point and connects to the first access point by using the credential, thereby accessing the first secure computer network and joining the other computing devices on this network. The network access device can terminate the second access point, thereby effectively removing the secure computer network.

In an example, to set-up the second access point and establish the second secure computer network, the network access device can interact with a server over a secure channel. More particularly, the computing device and the server can share a secret, such as an encryption key. The computing device generates a network identifier of the second computer network and a credential to access this second computer network based on the shared key. This credential is referred to herein as a shared credential to distinguish it from the credential described in the previous paragraph. In addition, the computing device sends a request to the network access device, where the request includes the network identifier, but not the shared credential. In response, the network access device sends a device identifier of the computing device and the network identifier to the server over the secure channel. Based on the shared secret, the server generates the same shared credential and instructs the network access device to set-up the second access point with the network identifier and the shared credential. The network access device sets up the second access point accordingly, thereby allowing the computing device to connect thereto by using the network identifier and the shared credential. Once this secure connection is established, the network access device can use the secure connection to send relevant network data to the computing device, where the relevant network data allows the computing device to securely connect to the first access point.

To illustrate, consider an example of a home network of a user, where this network includes internet of things (IoT) devices, a home access point, and a smart hub. The smart hub is registered under a user account of the user with a service provider. Upon obtaining a new smart speaker, the user account is updated to also register this new device. The smart speaker stores a public key of a cloud server of the service provider, in addition to a private key of the smart speaker. Conversely, the cloud server stores a public key of the smart spear, in addition to a private key of the cloud server.

In this illustrative example, the smart speaker implements a version of the WPA protocol (e.g., WPA-Personal or WPA/WPA2-PSK (pre-shared key)) and, thus, needs the service set identifier (SSID) and the passphrase of the home network to join this network. Upon the first power on, the smart speaker generates an SSID for a second secure computer network to be established by the smart hub specifically for the smart speaker. The SSID includes an identifier of the supported WPA protocol, a device identifier derived from the public key of the smart speaker, a nonce. The smart speaker also derives a shared key from the public key of the cloud server and the private key of the smart speaker. Further, the smart speaker generates and stores a passphrase for the second secure computer network as a function of the nonce and the shared key. A Wi-Fi probe request is broadcasted by the smart speaker and includes the SSID, but not the passphrase. The smart hub receives the probe requests, generates an event message that includes the SSID and a medium access control (MAC) address of the smart speaker, and sends the event message to the cloud server over a transport layer security (TLS) channel. In response, the cloud server determines that the smart speaker and the smart hub are registered under the same user account, derives the shared key based on the private key of the cloud server and the public key of the smart speaker, and generates the same passphrase as a function of the shared key and the nonce received in the event message. The smart hub receives a command of the cloud server over the TLS channel to establish a soft access point that uses the SSID and the passphrase. Accordingly, the smart hub sets up the soft access point and the smart speaker connects thereto by using the SSID and the passphrase that were previously generated and stored by the smart speaker. Once this wireless connection is established, the smart hub generates a second passphrase specific to the smart speaker based on the smart speaker's internet protocol (IP) address and MAC address, where this second passphrase is usable to connect to the home access point. The smart speaker disconnects from the soft access point and connects to the home access point by using the second passphrase according to the supported WPA protocol.

Embodiments of the present disclosure provide multiple technical advantages over existing systems and methods for connecting a computing device to a computer network. For example, the embodiments improve the scalability. In particular, a computing device can join a secure computer network in an automated and seamless manner without necessitating any user input (beyond powering on the computing device). Thus, the embodiments support adding any and large numbers of computing devices with minimal user effort. Whether the user is adding their first IoT device or their hundredth one, the effort may merely involve the user powering on this computing device for adding the computing device to the secure computer network. In addition, the embodiments improve the security of the computer network. In particular, the connection to the secure network is established by following multiple phases. In each of such phases, a credential unique to the computing device is used. Hence, if this credential is leaked or compromised, only the computing device is impacted and its connection to the secure computer network may fail. Other computing devices remain connected and their access to the secure computer network may not be compromised. Furthermore, the scalability can further enhance the security because an improved workflow for rotating credentials can be executed. In particular, based on various triggers (e.g., a predefined schedule), each of the connected computing devices can disconnect from the secure computer network, receive a new credential, and reconnect to the secure computer network in a seamless manner. These and other improvements are further described in connection with the next figures.

In the interest of clarity of explanation, various embodiments of the present disclosure are described in conjunction with a Wi-Fi connection that uses a WPA-based security protocol (e.g. WPA-Personal, WPA/WPA2-PSK, or WPA-Enterprise). However, the embodiments are not limited as such and similarly apply to any other type of connections, whether wired or wireless, and to any other type of security protocols. Also in the interest of clarity of explanation, a smart hub is described. However, the embodiments are not limited as such and similarly apply to any other type of a network access device. A network access device is generally a computing device that manages, provides, controls, and/or facilitates access of one or more other computing devices to a computer network. A network hub, a network switch, a network router, an access point, and any combination of such devices are examples of a network access device. In addition, a computing device that is already on a secure computer network can be configured to set-up, at least temporarily, a soft network access device by executing code that embodies operations of the network access device.

FIG. 1 illustrates an example of phases for connecting a computing device 110 to a secure network 120 via a smart hub 130, according to an embodiment of the present disclosure. Generally, the computing device 110 is first associated with a user account. Upon a trigger event, such as first power on, the computing device 110 sends a request for connecting to a second network (for clarity, referred to herein as a temporary network). The smart hub 130 involves a server 140 to set-up a provisioning access point 150 for this temporary network and generates and passes a credential 152 for the secure network 120 to the computing device 110 via the provisioning access point 150. Thereafter, the computing device 110 disconnects from the temporary network and joins the secure network 120 via an access point 170 of the secure network 120. FIG. 1 shows this approach in multiple phases.

As illustrated, at an initial phase, a device-to-user account registration 101 is performed. The device-to-user account registration 101 supports a subsequent cloud-based setup of the connection to the secure network 120 in a secure manner. In turn, the cloud-based setup can involve multiple phases including one for discovery and provisioning 102 and one for connection and access 103. The discovery and provisioning 102 relies on the device-to-user account registration 101 to ensure that the computing device 110 is authenticated to the server 140 to then set-up the provisioning access point 150 and pass the credential 152 to the computing device 110. The connection and access 103 occurs once the credential 152 is available to the computing device 110, whereby the device uses this credential 152 to join the secure network 120. At each of these phases, different computing components are involved as further described herein next.

At the initial phase of the device-to-user account registration 101, the server 140 receives data about the computing device 110 from a remote device 114. This data generally identifies the computing device 110 and includes information unique to the computing device 110 and usable for authentication, such as a public key of the computing device 110 or a portion of this public key. The data can also identify a user account of a user that obtained (e.g., purchased) the computing device 110.

In an illustrative example, upon a purchase of the computing device 110 under the user account, the data can be generated and stored (e.g., encoded) in a label 116 (e.g., a barcode) attached to a container 118 (e.g., a box) storing the computing device 110 (or attached directly to the computing device 110). As part of providing the computing device 110 to the user, the remote device 114 is used to scan the label 116, and read and send the data to the server 140. In response, the server 140 generates and stores the device-to-user account registration 101. For instance, the server 140 updates the user account to store some or all of the received data, including the device identifier (e.g., its MAC address), the type of the computing device 110, and the public key or portion thereof. Also at this phase, a public key of the server 140 is loaded onto the computing device 110 (e.g., as a part of manufacturing or providing the computing device 110). Further details about the computing components and the interactions between them in this initial phase are further described in relation to FIG. 2.

At the next phase of the discovery and provisioning 102, the user receives the computing device 110 (e.g., receives the container 118 and unpacks the computing device 110 therefrom). At this phase, it is assumed that the secure network 120 is already set-up and includes the smart hub 130, the access point 170 (referred to herein as a home access point (AP) 170 for clarity), and other IoT devices of the user. The smart hub 130 and the other computing devices may have been previously registered under the user account by following a similar process as the one described in connection with the computing device 110. In an example, the secure network 120 represents a secure home network (e.g., a home local access network (LAN)) for different computing devices (e.g., IoT devices) of the user.

The user then powers on the computing device 110. If the computing device 110 determines that it has not been connected yet to a home network such as a home LAN (e.g., the first time the computing device 110 is powered on), the computing device 110 generates and stores an SSID and a passphrase for the temporary network (e.g., a temporary LAN) and broadcasts a Wi-Fi probe request 162 that includes the SSID and that excludes the passphrase. The smart hub 130 receives the Wi-Fi probe request 162, sends the SSID and a device identifier of the computing device 110 (e.g., MAC address) to the server 140 over a secure channel. The server 140 verifies that the smart hub 130 and the computing device 110 are registered under the same user account, generates the same passphrase, and returns a command to the smart hub 130 to set-up the provisioning access point 150 with the SSID and passphrase. In turn, the smart hub 130 sets up the provisioning access point 150 as, for instance, a soft access point and sends a Wi-Fi probe response 164 to the computing device indicating that the provisioning access point 150 is available. The provisioning access point 150 controls access to the temporary network based on the SSID and passphrase. In other words, the provisioning access point 150 represents a temporary access point that is set up so that a Wi-Fi connection to the temporary network can be possible only if the computing device 110 sends the correct SSID and passphrase to the provisioning access point 150.

Once the Wi-Fi probe response 164 is received, the computing device 110 connects to the provisioning access point 150 by using its stored SSID and passphrase. Further, the smart hub 130 generates and sends, via the provisioning access point 150, a credential specific to the computing device 110 for accessing the secure network 120.

Once the credential 152 is sent, the connection and access 103 phase is initiated. In particular, the computing device 110 can receive the credential 152, perform a Wi-Fi scan, identify the SSID of the secure network 120 (e.g., the home LAN), disconnect from the temporary network (e.g., the temporary LAN), and connect to the secure network 120 via the home access point 170 by using the SSID and the credential 152. At this point, the computing device 110 has joined the secure network 120 and can have access to other networks 122 through the access point 170 and the smart hub 130, including to public networks such as the Internet. The smart hub 130 can also terminate the provisioning access point 150 (e.g., stop executing the software code of this access point), thereby removing the temporary network.

In the interest of clarity of explanation, FIG. 1 describes multiple phases that involve particular computing components. However, embodiments of the present disclosure are not limited as such. For example, the server 140 may be a cloud-server and/or a computing component of a backend system that includes one or more servers. The functionalities of the server-based setup process can be distributed within the backend system. In another example, the smart hub 130 can be implemented as a soft hub executed by a second computing device of the user already on the secure network 120. Upon the computing device 110 joining the secure network 120, the second computing device can terminate the execution of the soft hub.

Figure 2:
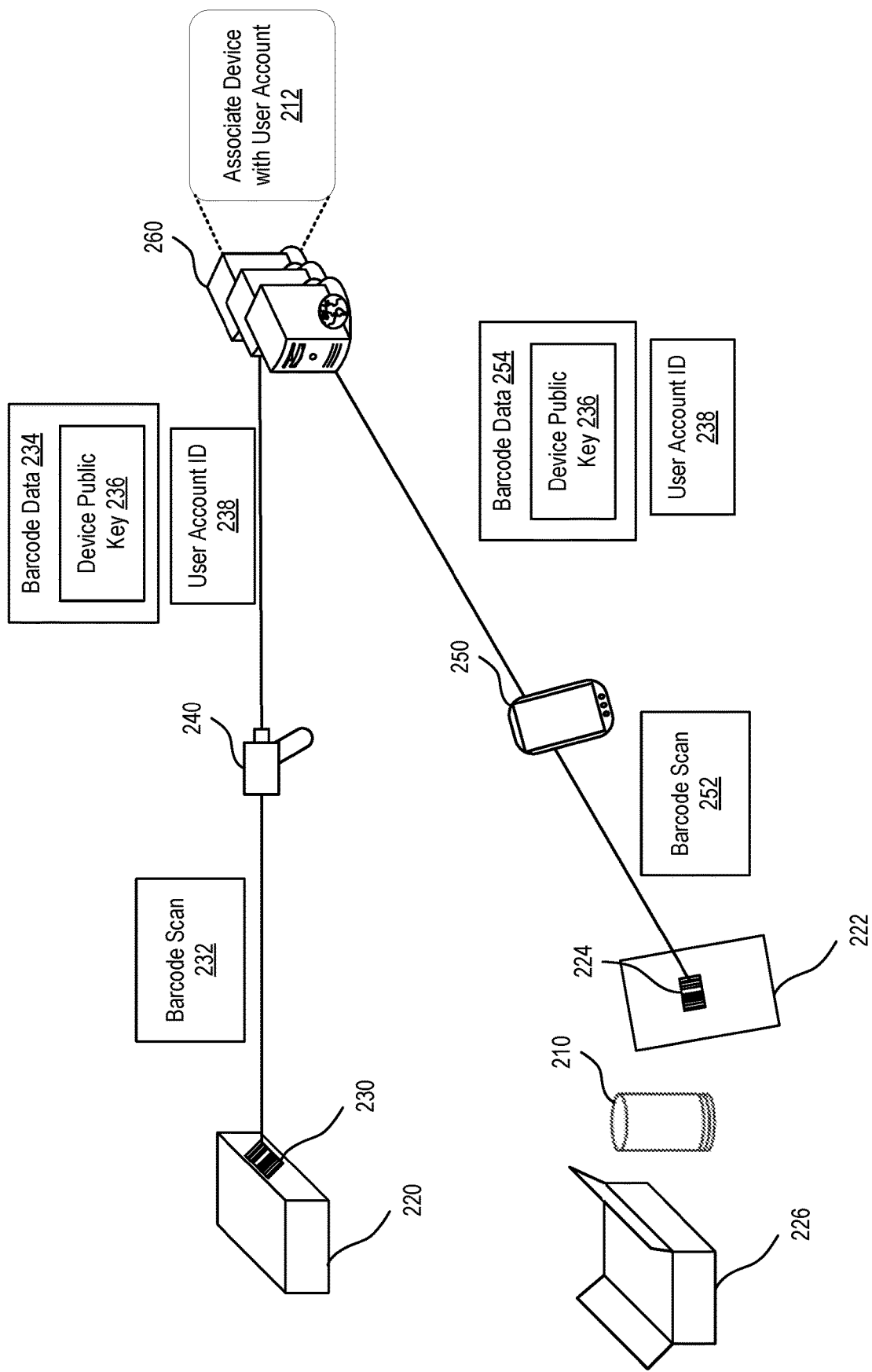
FIG. 2 illustrates examples of associating a computing device with a user account, according to an embodiment of the present disclosure.

FIG. 2 illustrates examples of associating a computing device with a user account, according to an embodiment of the present disclosure. The association of the computing device with the user may be performed to generate a device-to-user account registration, similar to the device-to-user account registration 101 of FIG. 1. FIG. 2 illustrates two examples for generating this association. In a first example, shown as starting in the top part of FIG. 2, a computing device is obtained (e.g., purchased) by a user from a service provider, where the user has a user account with the service provider. The service provider can generate the association. In a second example, shown as starting in the bottom part of FIG. 2, the user obtains the computing device from a third party. In this example, the user (or the third party) can generate the association. Other examples for generating the device-to-user account registration are also possible including, for instance, a conventional online registration of a computing device under the user account.

In the first example, a user orders a computing device 210 from the service provider (e.g., purchases it online from a web site of the service provider). The computing device 210 is an example of the computing device 110 of FIG. 1. Generally, the computing device 210 can be any suitable user device including one or more processors, one or more memories, and one or more interfaces for executing one or more applications, interacting with the user, interfacing with remote computing devices, and the like. For instance, the computing device 210 can be a voice-controlled multimedia device (VMCD) representing a smart speaker providing an intelligent personal assistant service responsive to a wakeword and capable of different interactions including content playing, providing real-time information, and performing tasks and routines, smart plug, multimedia streaming device, or any other device hosting an intelligent personal assistant service, a power management service, a streaming service, and/or other applications. In other illustrations, the computing device 210 can be a mobile phone, a tablet, a desktop computer, a smart television, a digital video recorder, a smart power plug, a smart camera, or any other user device or IoT device having one or more processors, one or more memories, and one or more interfaces.

In a storage facility of the service provider, the computing device 210 can be added to a container 220 for delivery to the user. A barcode 230 can be attached to the container 220 (e.g., to an external surface of this container 220) and can encode data related to the computing device 210 (e.g., the product number, a public key or a portion thereof, and/or a type of the computing device 210, where the type can be a product category such as VCMD, a smart power plug, etc.). Optionally, the barcode can also encode data about the user account of the user. A remote device 240, such as a scanner at the storage facility (e.g., a handheld scanner or a product scanner in a workstation of the storage facility), performs a barcode scan 232 to read the barcode data 234 (e.g., the data encoded in the barcode 230). The remote device 240 is communicatively coupled with a server 260 (or, more generally, a backend system) of the service provider and sends the barcode data 234 to this server 260. In an illustration, the remote device 240 is on a same network with a central computer that manages purchase orders of users. The barcode data 234 is sent from the remote device 240 to this central computer and the central computer sends it to the server 260. The barcode data 234 includes, for instance, the public key of the computing device 210 (shown as device public key 236) or the portion of the device public key 236 that was encoded in the barcode 230. Other data can also be included such as the computing device's 210 product number (e.g., a serial number, MAC address, etc.) and/or product category. The product category can represent a type of the computing device 210, such as whether the computing device 210 is a VCMD, smart power plug, multimedia streaming device, etc. For clarity in the present disclosure, a product category of a computing device can be referred to as a type of the computing device. In addition, if the barcode 230 encoded data about the user account, the barcode data 234 can include an identifier 238 of the user account. Otherwise, the server 260 can receive the identifier 238 separately from the barcode data 234. For instance, another barcode attached to the container 220 and/or printed in a purchase order encodes the identifier 238. Upon a scan of this barcode, the remote device 240 reads and sends the identifier 238 from this barcode to the server 260. Additionally or alternatively, the identifier 238 can be sent from the central computer based on a user purchase of the computing device and based on this central computer receiving the barcode data 234 from the remote device 240.

In turn, the server 260 receives the barcode data 234 and the identifier 238 of the user account and associates 212 the computing device 210 with the user account. For instance, the server 260 looks up the user account based on the identifier 238 of the user account and adds to this account some or all of the barcode data 234 including, the device public key 236 (or the portion thereof), the product number, and/or the device type. Additionally or alternatively, the server 260 can update a list that associates device public keys with user account. Such a list is referred to herein as a public key-user account list. For instance, the device public key 236 (or portion thereof) can be added as a key, and the identifier 238 can be added as a value in the public key-user account list. Generally, the server 260 can be implemented as specialized server hardware, as server-based software running on general purpose hardware, and/or as a cloud-based computing service. The server 260 can be a computing component of the backend system of the service provider, where this backend system may store user accounts for different users and provide computing services (e.g., multimedia streaming) to computing devices of the users based on the user accounts. Although the embodiment illustrated in FIG. 2 is provided in relation to a barcode and a barcode scanner, other data entry methods and systems can be utilized, including radio frequency identifiers (RFIDs) or the like.

In the second example, rather than using a product scanner, the remote device can be a mobile device 250 of the user, such as a smartphone. The mobile device 250 can execute a mobile application (e.g., an "app") to communicate with the backend system of the service provider based on a user login on the mobile application to the user account. In this example, the user may receive a container that includes the computing device 210 and a sheet 222 (e.g., a paper, a brochure, a user manual, etc.). This sheet 222 includes barcode 224, similar to the barcode 230, encoding the above data. The sheet 222 can, but need not be attached to the computing device 210. Upon opening the container (shown as container 226 in an open state in FIG. 2), the user retrieves the computing device 210 and the sheet 222 and uses the mobile application to perform a barcode scan 252 of the barcode 224 (e.g., to capture an image of the barcode 224). In turn, the mobile application reads the encoded data and sends barcode data 254 to the server 260. The barcode data 254 includes, for instance, the device public key 236 (or the portion thereof). Other data can also be included such as the computing device's 210 product number and/or type. In addition, if the barcode 230 encoded data about the user account, the barcode data 234 can include the identifier 238 of the user account. Otherwise, this identifier 238 is determined based on the user login to the user account.

Here also, the server 260 receives the barcode data 254 and the identifier 238 of the user account and associates 212 the computing device 210 with the user account. For instance, the server 250 looks up the user account based on the identifier 238 and adds to this account some or all of the barcode data 254 including, the device public key 236 (or the portion thereof), the PIN 238, the product number, and/or the device type. In an illustration, the mobile device's 250 barcode scan 252 is usable to register the computing device 210 cab restricted to a set of factors. An example factor is data connectivity. In particular, only when the mobile device is connected to a particular computer network (e.g., a home network having an identifier registered with the server 260), the barcode scan data 254 may result in the association of the computing device 210 with the user account.

Figure 3:
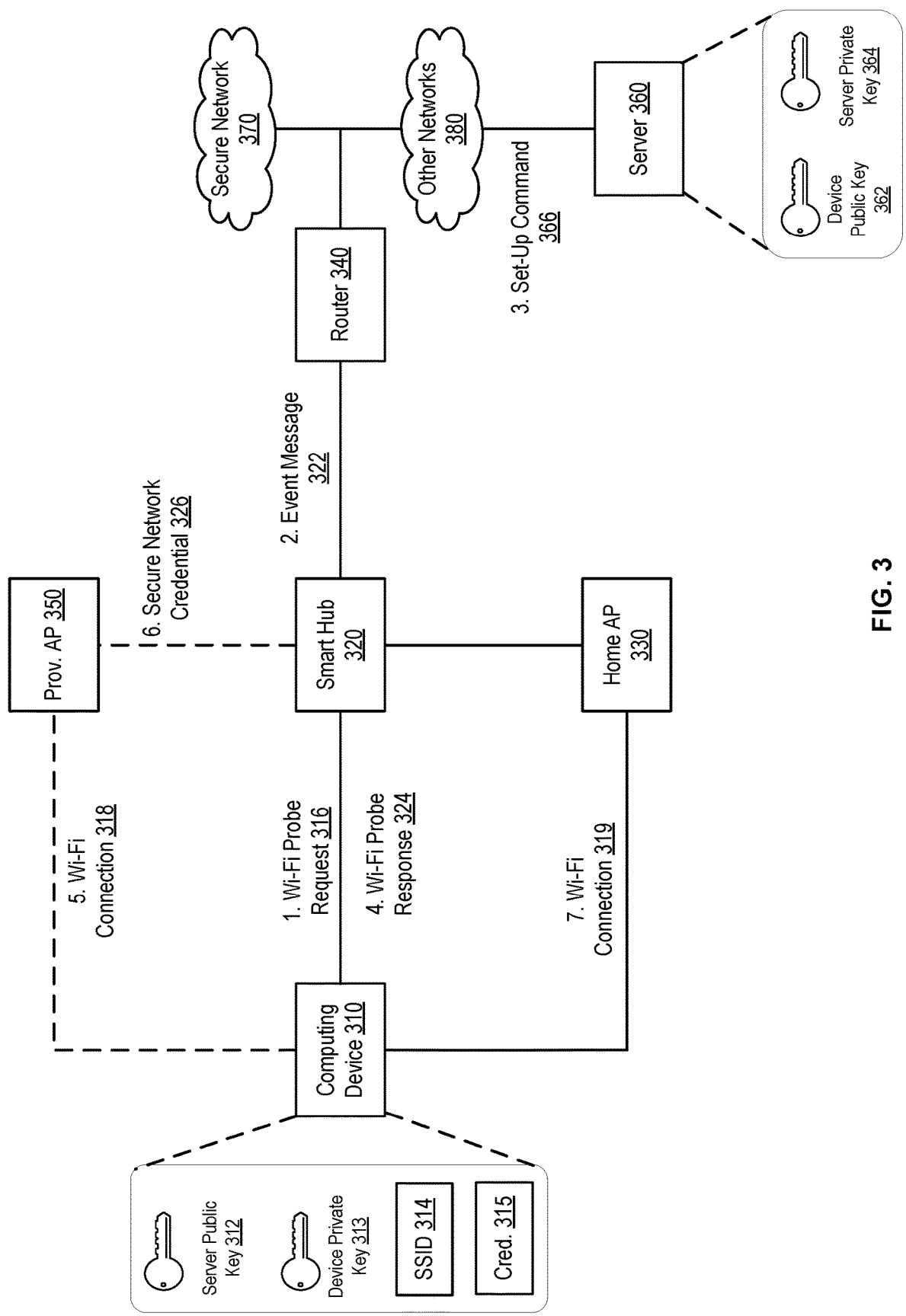
FIG. 3 illustrates an example of a system for connecting computing devices to computer networks, according to an embodiment of the present disclosure.

FIG. 3 illustrates an example of a system for connecting computing devices to computer networks, according to an embodiment of the present disclosure. As illustrated, the system includes a computing device 310, a smart hub 320, a home access point 330, a router 340, a provisioning access point 350, and a server 360. The smart hub 320, the home access point 330, and the router 340 belong to a secure computer network 370, such as a home network, that may include a number of other computing devices. The router 340 may connect the secure computer network 370 to other computer networks 380, including public networks such as the internet. The server 360 may be communicatively coupled with the secure network 370, including with the smart hub 320, via one or more of the other networks 380. For instance, a TLS channel exists between the smart hub 320 and the server 360.

A user may desire to connect the computing device 310 to the secure computer network 370. To support the connection, the smart hub 320 sets up the provisioning access point 350 at least temporarily and specifically for the computing deice 310. By doing so, the computing device 310, the provisioning access point 350, and the smart hub 320 form a temporary computer network. This network may be a second secure computer network necessitating a credential (e.g., a passphrase for access thereto). The smart hub 320 also sends a credential for the secure computer network 370 to the computing device 310 over the provisioning access point 350. The computing device 310 then joins the secure computer network 370 by connecting to the home access point 330 based on the credential and disconnecting from the temporary computer network.

In an example, the computing device 110 stores a server public key 312 (e.g., a public key of the server 360) and a device private key 313 (e.g., a private key of the computing device 110). Upon a trigger event, the computing device 110 generates and stores an SSID 314 and a credential 315 for the temporary computer network based on the server public key 312 and the device private key 313. The trigger event can be a power on for the first time, a connection failure following a previous connection with the home access point 330, a command of the smart hub 320, or a time-based trigger (e.g., a schedule to rotate credentials). The type of the credential 315 can depend on the security protocol that the computing device supports 110. For WPA-Personal and/or WPA/WPA-PSK, the credential 315 includes a passphrase. For WPA-Enterprise, the credential 315 includes a passphrase and/or a certificate.

The computing device 110 also broadcast a Wi-Fi probe request 316 that includes the SSID 314 and excludes the credential 315. The smart hub 320 receives and verifies whether the Wi-Fi broadcast request 316 is valid. If so, the smart hub generates an event message 322. Otherwise, the Wi-fi probe request 316 is ignored. The event message 322 includes the SSID and a device identifier of the computing device 310, such as the computing device's 310 MAC address. The event message 322 is sent to the server 360 over the TLS channel. In an illustration, the smart hub 320 represents a network hub that includes one or more processors and one or more non-transitory computer-readable media storing instructions corresponding to the operations and functionalities of the smart hub 320 described in the present disclosure.

The server 360 receives the event message 322 and determines whether the smart hub 320 and the computing device 310 are associated with the same user account. If so, the server 360 further processes the event message 322 and returns a set-up command 366 to the smart hub 320 over the TLS channel. Otherwise, the event message 322 is ignored. The processing includes determining the SSID from the event message 322 and generating a credential for the SSID. In an illustration, the server 360 uses a portion or all of the SSID, the device public key 362, and the server private key 364 to derive this credential and whether this credential is the same as the credential 315 generated and stored by the computing device 310. The set-up command 366 includes the SSID and the credential and is received by the smart hub 320.

In response, the smart hub 320 sets up the provisioning access point 350 to restrict access to the temporary computer network having the SSID and to require the credential for the access. The smart hub 320 also sends a Wi-Fi probe response 324 responding to the Wi-Fi probe request 316 and indicating that the provisioning access point 350 or, equivalently, the temporary computer network is available.

Upon receiving the Wi-Fi probe response 324, the computing device 310 performs a scan and identifies the temporary computer network. At that point, the computing device 310 presents the SSID and the credential 315 to the provisioning access point 350 and authentication is performed. Upon completion of the authentication, a Wi-Fi connection 318 is established between the computing device 310 and the provisioning access point 350. Hence, a Wi-Fi connection exists between the smart hub 320 and the computing device 310 via the provisioning access point 350.

At this point, the computing device 310 has been added to the temporary computer network. The smart hub 320 can restrict the activities of the computing device 310 within this computer network and restrict access of the computing device 310 to other networks including the secure computer network 370 and the other computer network 380. For instance, the smart hub 320 may prevent the access of the computing device 310 to the secure computer network 370. In addition, the smart hub 320 may restrict (e.g., by using filters) the data exchange with the computing device 310 to exchanging relevant connection data for setting up a new Wi-Fi connection to the secure computer network 370 over the home access point. Alternatively, the smart hub 320 may provide full or partial access (e.g., also by using filters) of the computing device 310 to the other computer network 380.

Furthermore, the smart hub 320 generates a credential specific to the computing device 310 and usable to connect to the secure computer network 370 (illustrated as a secure network credential 326). The relevant connection data can also include the SSID of the secure network 370 and one or more configuration parameters for the connection (e.g., IP address, default gateway, domain name system (DNS) configuration, etc.). The smart hub 320 sends the relevant connection data, including the secure network credential 326 to the computing device 310 via the provisioning access point 350. Based on a termination event, the smart hub 320 terminates the provisioning access point. The termination event can be the transmission of the relevant connection data, a detection that the computing device 310 disconnected from the temporary computer network, and/or a detection that the computing device 310 connected to the secure computer network 370.

The computing device 310 receives the relevant connection data and connects to the home access point 330 accordingly. For instance, the computing device 310 performs a scan and identifies the secure computer network 370. At that point, the computing device 310 presents the SSID of this network 370 and the secure network credential 326 to the home access point 330 and authentication is performed. Upon completion of the authentication, a Wi-Fi connection 319 is established between the computing device 310 and the home access point 330. The computing device 310 can also disconnect from the provisioning access point 350. At this point, the computing device 310 has joined the secure computer network 370. In addition, a Wi-Fi connection exists between the smart hub 320 and the computing device 310 via the home access point 330 and the smart hub can manage access of the computing device 310 to the other computer network 380 based on any applicable restrictions.

Figure 4:
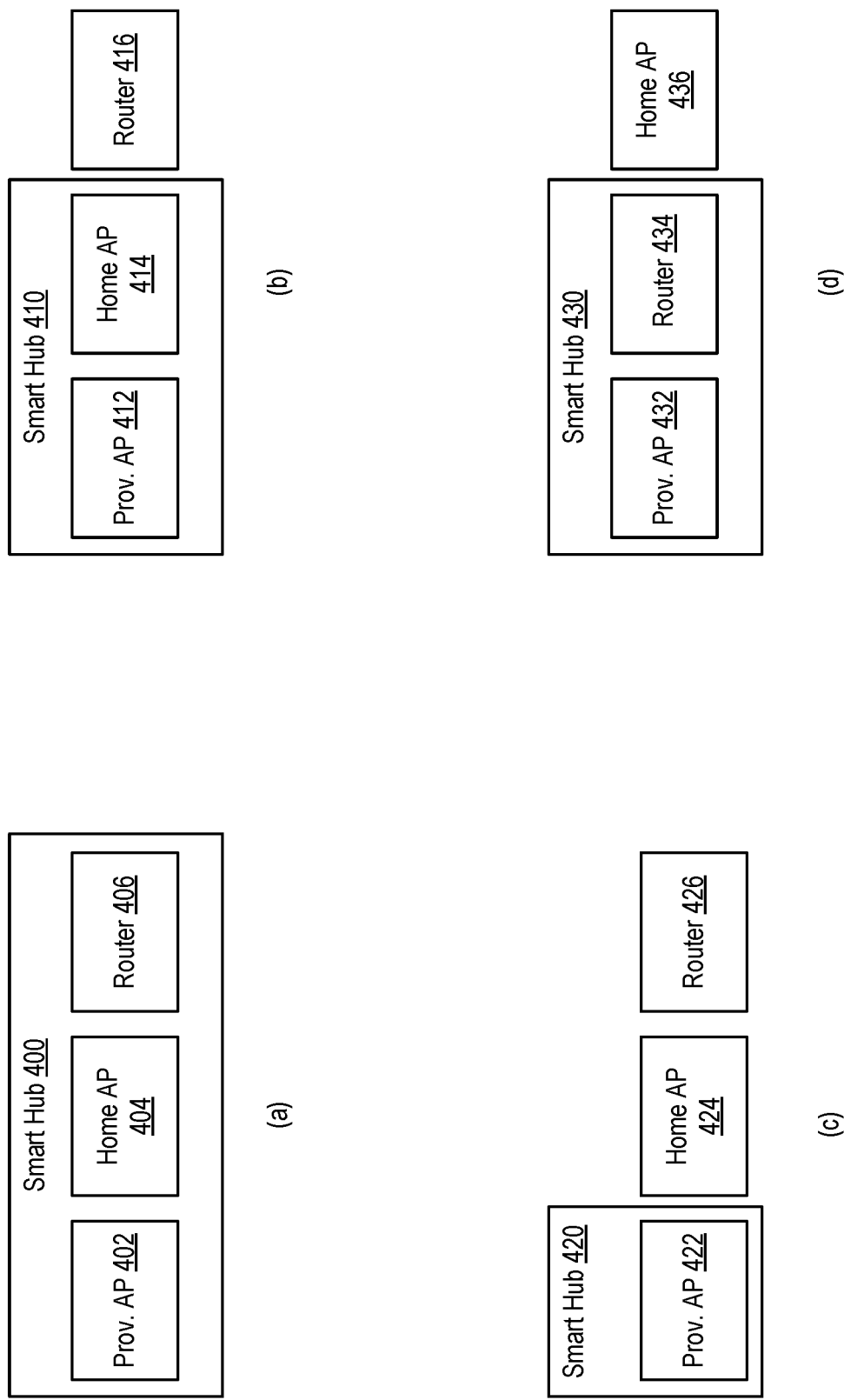
FIG. 4 illustrates examples of a smart hub, according to an embodiment of the present disclosure.

FIG. 4 illustrates examples of a smart hub, according to an embodiment of the present disclosure. In addition to including a network hub, the smart hub can include any or a combination of a provisioning access point, a home access point, and a router among other network access devices. "Provisioning" and "home" are used to herein to refer to a provisioning access point that provides access to a computer network other than a home computer network of a computing device, whereas a home access point provides access to the home computer network. Each of the provisioning access point, a home access point, and a router can be implemented as a hardware component of the smart hub, as applicable. Alternatively, the smart hub can access software, as applicable, software code in its memory for each of such computing components, where this code is executable by a processor of the smart hub to provide the functionalities and operations of the computing component. FIG. 4 illustrates four examples of a smart hub.

In a first example, a smart hub 400 includes a provisioning access point 402, a home access point 404, and a router 406. Although the provisioning access point 402, the home access point 404, and the router 406 are shown as separate computing components, some or all these computing components can be integrated with each other. For instance, the router 406 can integrate the home access point 404. Additionally or alternatively, the home access point 404 can integrate the provisioning access point 402.

In a second example, a smart hub 410 includes a provisioning access point 412 and a home access point 414. A router 416 can be a separate computing component from the smart hub 410. Here also, the home access point 414 can integrate the provisioning access point 412.

In a third example, a smart hub 420 includes a provisioning access point 422. A home access point 424 and a router 426 can be separate computing components from the smart hub 420. Here also, the router 426 can integrate the home access point 424.

In a fourth example, a smart hub 430 includes a provisioning access point 432 and a router 434. A home access point 436 can be a separate computing component from the smart hub 430. Here also, the router 434 can integrate the provisioning access point 432.

Other variations of a smart hub are also possible. For example, the smart hub can be another IoT device on the secure network, such as a VCMD, a smart power plug, a media streaming device, or any other end user device. The IoT device can set-up, at least temporarily, a provisioning access point by executing software code that embodies functionalities and operations of the provisioning access point.

Figure 5:
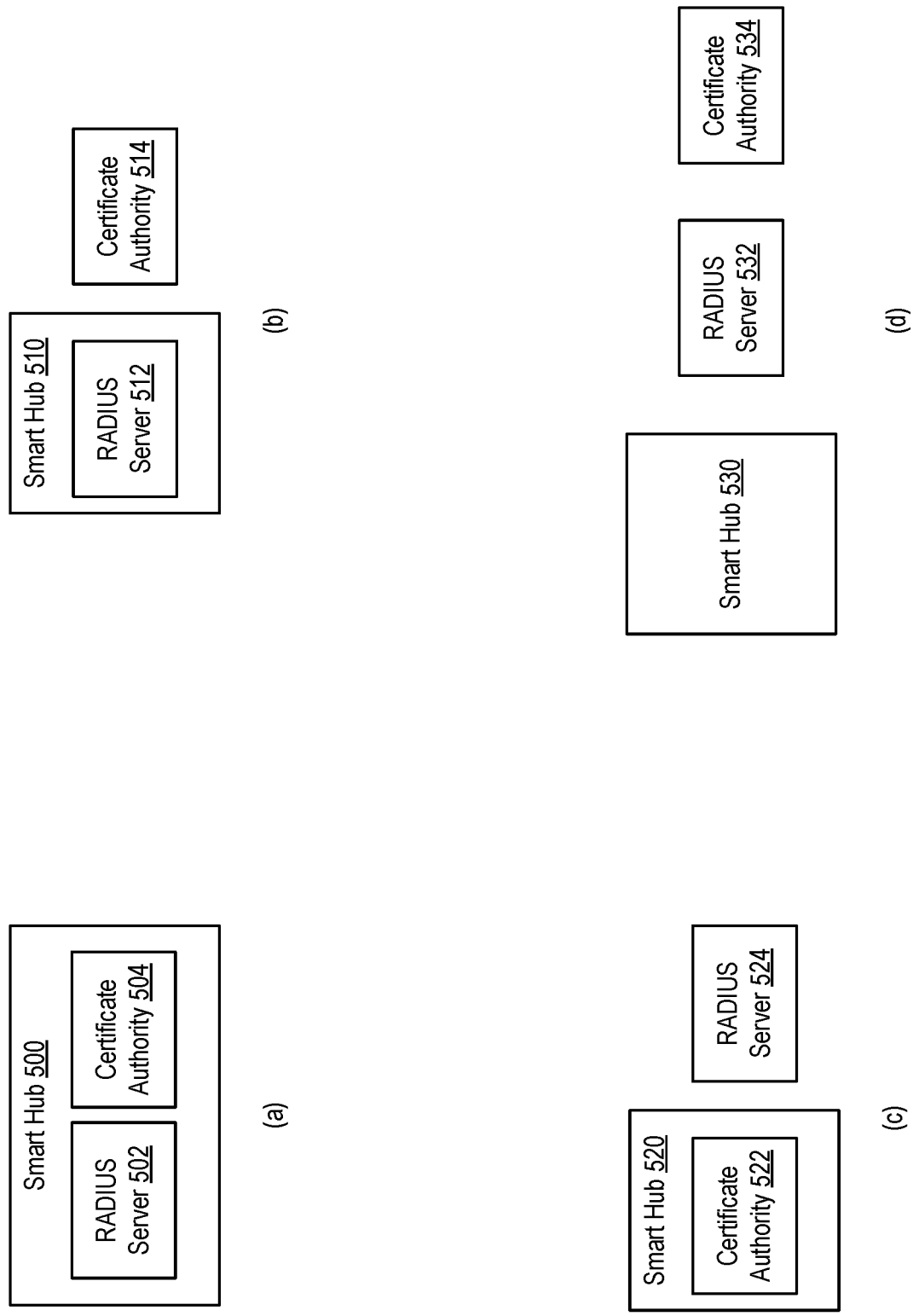
FIG. 5 illustrates other examples of a smart hub, according to an embodiment of the present disclosure.

FIG. 5 illustrates other examples of a smart hub, according to an embodiment of the present disclosure. As described herein above, embodiments of the present disclosure support various security protocols including the WPA-Enterprise protocol. Generally, using the WPA-Enterprise involves the certificate authority (CA) and the remote authentication dial-in user service (RADIUS) protocol that provides centralized authentication, authorization, and accounting (AAA) management for users who connect and use a network service. As illustrated in FIG. 5, the smart hub can provide CA and RADIUS functionalities. In particular, in a first example, a smart hub 500 include a RADIUS server 502 and a CA 504, in addition to any other network access device as described in connection with FIG. 4. In a second example, a smart hub 510 includes a RADIUS server 512 but not a CA 514. Instead, a secure channel can exist between the smart hub 510 and the CA 514. In a third example, a smart hub 520 includes a CA 522 but not a RADIUS server 524. Instead, a secure channel can exist between the smart hub 520 and the RADIUS server 524. In a fourth example, a smart hub 530 does not include a RADIUS server 532 or CA 534. Instead, secure channels can exist between the smart hub 530 and the RADIUS server 532 and CA 534.

Figure 6:
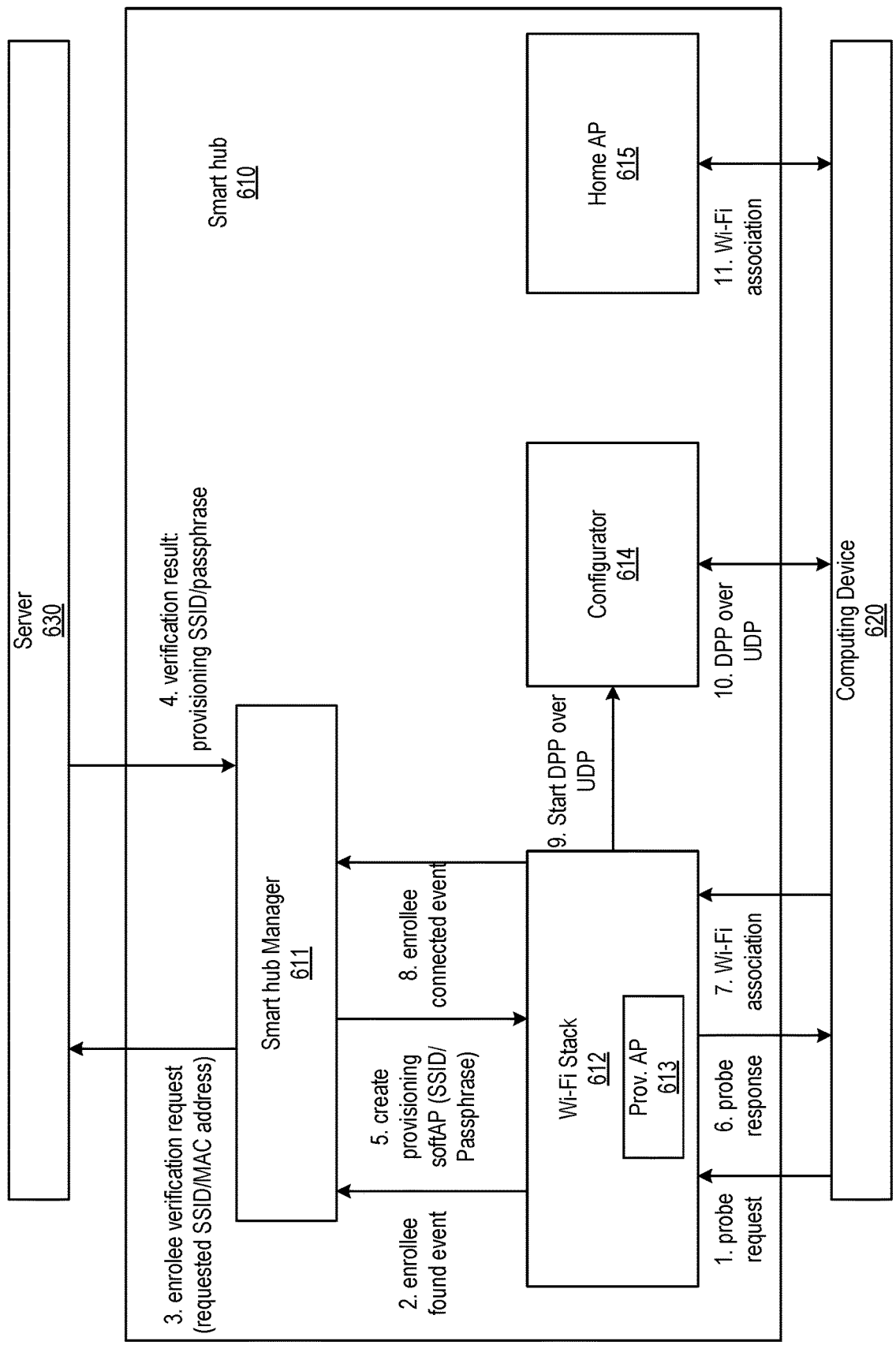
FIG. 6 illustrates an example of an implementation of a smart hub, according to an embodiment of the present disclosure.

FIG. 6 illustrates an example of an implementation of a smart hub 610, according to an embodiment of the present disclosure. In an example, the smart hub 610 configures a computing device 620 to gain access to a secure computer network based on instructions from a server 630, where the security relies on a WPA protocol. To do so, the smart hub 610 includes a smart hub manager 611, a Wi-Fi stack 612 that generates a provisioning access point 613, a configurator 614 (e.g., a device provisioning protocol (DPP) configurator), and a home access point 615. The Wi-Fi stack 612 can be customized to support handling of a Wi-Fi probe request of the computing device 620 and per computing device credentials. The smart hub manager 611 can be an application that communicates with the server 630 to authenticate and onboard the computing device 620. The configurator 614 generates and transfers the per-client Wi-Fi credentials for the computing device 620 using, for example, DPP over a user datagram protocol (UDP). If WPA-Enterprise is involved, the configurator 614 also communicates with a certificate authority (CA) server to generate an X.509 certificate. Further, the home access point 615 communicates with a RADIUS server to authenticate the computing device 620.

As illustrated, the computing device 620 sends a Wi-Fi probe request with a coded SSID field. The Wi-Fi stack 612 receives this request, determines that the Wi-Fi probe request is from a potential new computing device needing Wi-Fi credentials to connect to a home network via the home access point 615, and generates an "enrollee found" event to the smart hub manager 611. The enrollee-found event contains the computing device's 620 coded SSID string and MAC address. The smart hub manager 611 forwards the enrollee-found event to the server 630. Based on the device identifier of the computing device 620, the server 630 verifies whether the computing device 620 is a registered device. If it is so, the server 630 derives a credential of the provisioning access point 613. The SSID and credential (e.g., a passphrase) are returned to the smart hub manager 611. The smart hub manager 611 commands the Wi-Fi stack 612 to generate the provisioning access point 613 with the credential for the specific MAC address of computing device 620. The Wi-Fi stack 612 starts to reply with the requested SSID to the computing device 620 via a Wi-Fi probe response. After finding the expected SSID from the scan result, the computing device 620 connects to the provisioning access point 613. Further, the Wi-Fi stack 612 notifies the smart hub manager 611 that the computing device 620 has been connected. Based on the connected computing device's IP and MAC addresses, the smart hub manager 611 starts a DPP configurator process for the computing device 620. The configurator 614 generates and assigns Wi-Fi credentials specific for the computing device 620 using, for example, DPP over UDP protocol. After obtaining the Wi-Fi credentials, the computing device 620 associates to the home access point 615 to start access to the secure computer network and, as applicable, other computer networks through the home access point 615.

Figure 7:
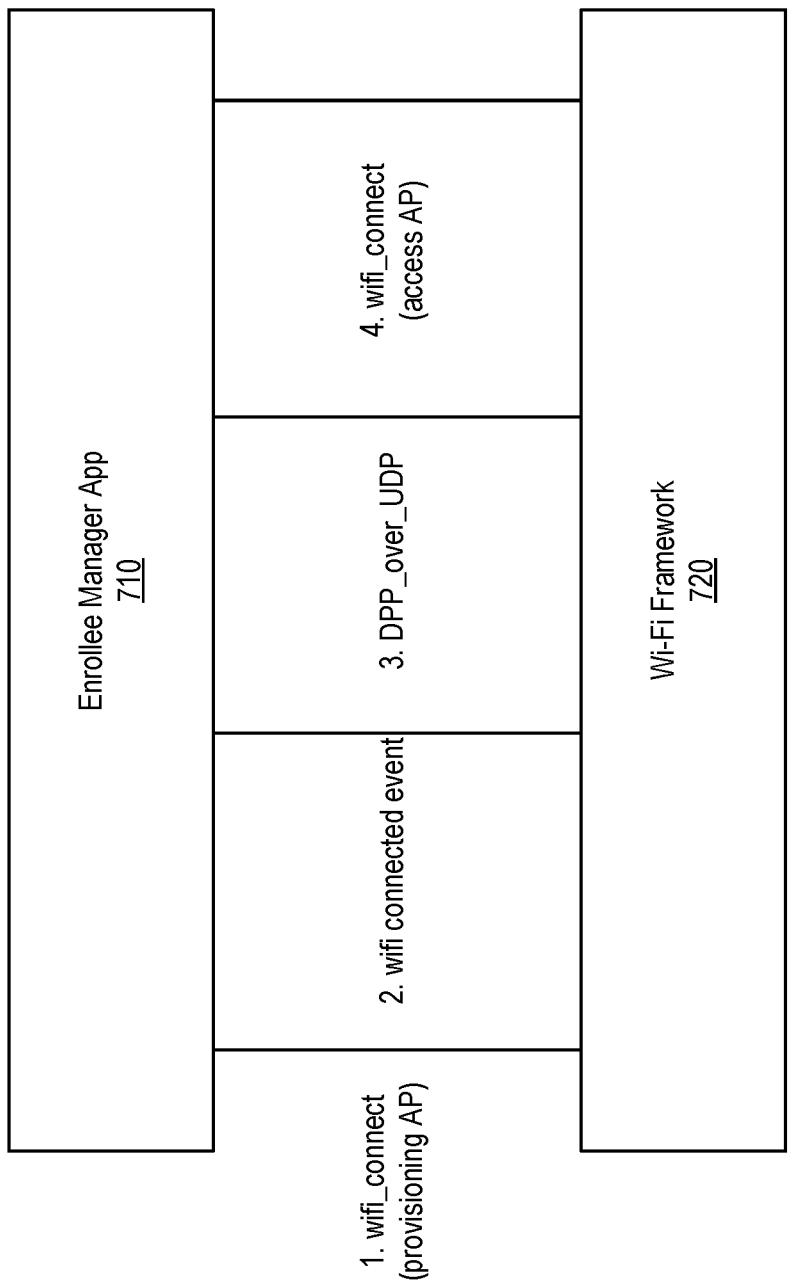
FIG. 7 illustrates an example of an implementation of a computing device, according to an embodiment of the present disclosure.

FIG. 7 illustrates an example of an implementation of a computing device, according to an embodiment of the present disclosure. In an example, the computing device is configured by a smart hub to gain access to a secure computer network, where the security relies on a WPA protocol. To do so, the computing device includes an enrollee manager application 710 and a Wi-Fi framework 720. The enrollee manager application 710 generates an SSID based on a supported WPA protocol of the computing device, a private key of the computing device, and a public key of a server protocol on enrollee devices. The enrollee manager application 710 can be an a software development kit (DSK) for an IoT platform, or an operating system application (OS app) developed by a first party or a third party and can be deployed to first party or third party IoT devices or mobile devices. The Wi-Fi framework 720 includes the computing device's Wi-Fi stack and a Wi-Fi connect application programming interface (API).

As illustrated, the enrollee manager application 710 generates a coded SSID token (e.g., an SSID having a specific data structure as further described in connection with the next figures), derives the requested credential (e.g., a passphrase), and generates the corresponding Wi-Fi profile using the SSID and credential. The enrollee manager application 710 calls the Wi-Fi connect API requesting the Wi-Fi stack to connect to a provisioning access point using the profile. The Wi-Fi stack conducts a direct scan. If multiple smart hub devices are nearby, one smart hub sets up the requested provisioning access point and accepts the computing device's Wi-Fi connection request using the credentials specified by the computing device. The enrollee manager application 710 receives an event from the Wi-Fi stack indicating that Wi-Fi is connected successfully. The enrollee manager application 710 starts DPP over UDP protocol to receive the Wi-Fi credentials of a home access point from the smart hub. The enrollee manager application 710 removes the provisioning access point profile, generates a new profile with the obtained Wi-Fi credential and calls Wi-Fi connect API again to connect to home access point.

Figure 8:
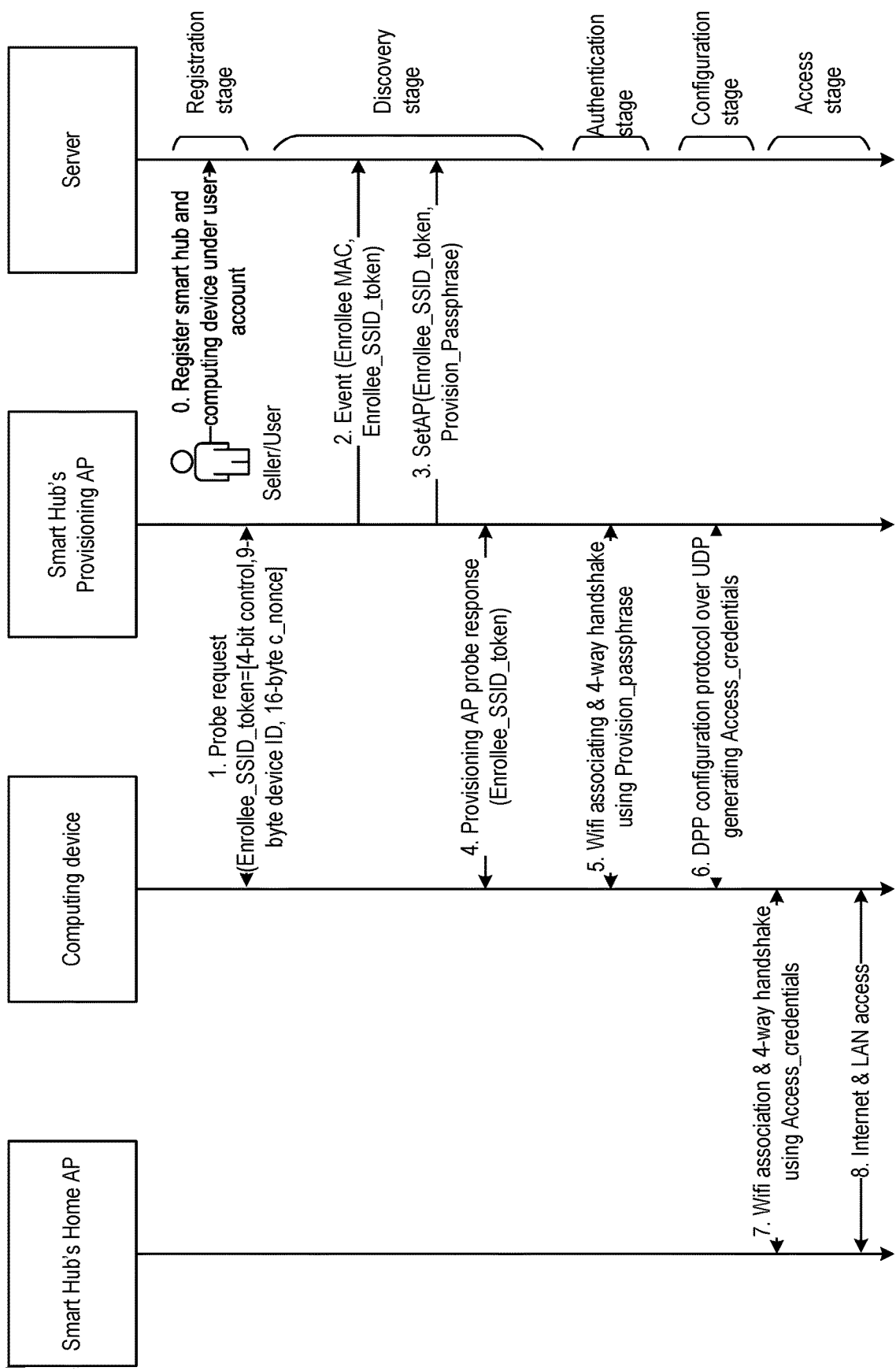
FIG. 8 illustrates an example of a sequence diagram for connecting a computing device to a secure computer network via a smart hub, according to an embodiment of the present disclosure.

FIG. 8 illustrates an example of a sequence diagram for connecting a computing device to a secure computer network via a smart hub, according to an embodiment of the present disclosure. The sequence diagram includes multiple stages, such as a registration stage, a discovery stage, an authentication stage, a configuration stage, and an access stage. These stages correspond to the phases described in connection with FIG. 1. For instance, the registration stage corresponds to the registration 101 phase of FIG. 1. The discovery, authentication stage and configuration stages correspond to the discovery and provisioning 102 phase of FIG. 1. The access stage corresponds to the connection and access 103 phase of FIG. 1.

As illustrated, the registration stage includes a set of registering the smart hub and the computing device under a user account. This step can be implemented by using the registration techniques as described in connection with FIG. 2. Generally, upon registering the smart hub, the smart hub is connected to the secure computer network. Thereafter, the computing device can request to join the secure computer network and is considered as an enrollee device.

The discovery stage includes multiple steps. In a first step, the computing device generates and broadcasts a Wi-Fi probe request. This request includes an SSID to be used for a provisioning access point. The SSID can be set according to a specific data structure in the Wi-Fi probe request. For instance this data structure includes multiple fields. A first field includes data about the supported security protocol, such as the supported WPA version. A second field includes a device identifier of the computing device. And a third field includes a nonce generated by the computing device. The three fields form the SSID. Additional fields can also be defined for the SSID and can be used to include specific information to pass to the server. In addition, the computing device generates a credential, such as a passphrase, and stores it with the SSID in a Wi-Fi profile.

In an illustrative example, the SSID is an encoded SSID token structure that contains the device identifier, where this device identifier is derived from a public key of the computing device. In the SSID token, a first field is a 4-bit control that contains the protocol version information, a second field is a 9-byte device identifier (a hash code derived from the computing device's public key), and a 16-byte client nonce c_nonce that is a random string used to derive the passphrase following HMAC-based key derivation function HKDF with the computing device's ECDH shared key as the HKDF hash-key. The generated 25.5 byte binary SSID token is encoded into 32-byte ASCII string using BASE85 to become SSID IE in the probe request frames. The passphrase is derived as follows:
ECDH_key=ECDH_SHA_compute_key(computing_device_private_key, server_public_key)
BIN_PROVISION_PASSPHRASE=HKDF(ECDH_Key, c_nonce, SHA_256) PROVISION_PASSPHRASE=BASE64_ENCODE(BIN_PROVISION_PASSPHRASE)

The following crypto primitives are used. First, an ECDH shared key generation defined as (ECDH_SHA_compute_key(local_private_key, peer_public_key). Second, an ECDH (Elliptic Curve Diffie Hellman) key generation function ECDH_SHA_compute_key is used to return the ECDH shared key based on the local elliptic curve private key and peer public key. ECDH share key is the SHA hash code of the shared secret code that is computed from the local private key and the remote peer's public key. Third, an HMAC key derivation function is used, where HKDF: HKDF(Key, Salt, Hash_method). HKDF is used to return the session key derived from random string "Salt" using "Hash_method" whose hash secret is "Key." In addition, binary-to-ASCII encoding and decoding are used, where BASE85_ENCODE(Binary_string), BASE85_DECODE (ASCII_string), BASE64_ENCODE(Binary_string), and BASE64_DECODE(ASCII_string). BASE85 and BASE64 are the binary-to-ASCII codec methods.

In a second step of the discovery stage, upon receiving the Wi-Fi probe request, the smart hub sends a message to the server to decode the SSID token structure and derive the passphrase requested by the computing device. This message can be sent as an event that includes the MAC address of the computing device and encoded SSID token. In addition, the smart hub can verify that the SSID token is valid before sending the message. The verification can includes checking that the amount of data (e.g., the byte size or the length) of the encoded SSID token is the expected size (e.g., an expected byte size or an expected length) and that the identified WPA version is one of supported WPA protocols.

In a third step of the discovery stage, the server receives the message and determines whether the computing device is a valid and registered device according to the device identifier field. For instance, the server uses the MAC address to lookup the public key of the computing device public from a key-user account list. If found, the server also checks whether the computing device is registered under the same account as the smart hub. The server retrieves the ECDH shared key of the computing device to derive the requested passphrase, and returns the passphrase to the smart hub. The server derives the requested provisioning passphrase by using the server's private key, the computing device's public key, and the nonce included in the encoded SSID as follows: ECDH_Key=ECDH_SHA_compute_key (serverprivate_key, computing_device_public_key) BIN_PROVISION_PASSPHRASE=HKDF(ECDH_Key, c_nonce, SHA_256) PROVISION_PASSPHRASE=BASE64_ENCODE(BIN_PROVISION_PASSPHRASE)

In a fourth step of the discovery stage, the smart hub sets up provisioning access point with the requested SSID and the passphrase and starts replying with Wi-Fi probe requests to the computing device's Wi-Fi probe requests.

Thereafter, the authentication stage starts. The authentication state can include the step of the computing device finding the provisioning access point from a scan result and connecting to the provisioning access to further authenticate itself using the requested passphrase over a Wi-Fi 4-way handshake. Through the 4-way handshake, the computing device and the smart hub conduct a mutual authentication to ensure the peers are registered entities with a trusted service (e.g., the service provided by the server).

Next, in the configuration the step of sending relevant connection data to the computing device is performed. The relevant connection data can include any or a combination of the SSID and credential to connect to the home access point, and one or more configuration parameters to use for this connection. For instance, after the Wi-Fi connection between the computing device and the smart hub's provisioning access point is successfully established, if the computing device only supports WPA-Personal (as specified in enrollee's "configuration attribute"), the smart hub generates a per-client Wi-Fi passphrase of the home access point for the computing device and transfers the generated Wi-Fi credentials (e.g., this passphrase) to the computing device over "configuration object" through DPP over UDP, as further illustrated in the next figure. Of course other protocols can be used for this transfer including hypertext transfer protocol secure (HTTPS). If the computing device supports WPA-Enterprise, the exchange of "configuration attribute" and "configuration object" between the smart hub and the computing device can be used to generate an X.509 certificate for the computing device. In an illustration, the computing device generates a certificate signing request (CSR) in "configuration attribute" to ask the smart hub to generate a device certificate. And the smart hub communicates with its CA server to sign the request and returns the device certificate to the computing device over "configuration object." The certificate authority could be a trusted external server or a self-signed root server built in the smart hub.

Besides the Wi-Fi credentials, the smart hub can also assign other settings to the computing device. The IP configurations such as IP address, default gateway and DNS can be configured at this stage. With this information, the computing device can apply static IP settings to avoid the dynamic host configuration protocol (DHCP) procedure while connecting to the smart hub's home access point. Static IP configuration can be relevant for battery powered 802.11ax Wi-Fi devices with target wake time (TWT) feature. Static IP settings can work together with TWT to allow the device to stay in sleep mode for hours or days without the need to wake up in order to renew IP addresses over DHCP. Another application layer configuration can be also assigned to the computing device. For example, if the computing device supports IoT constrained application protocol (CoAP) over datagram transport layer security (DTLS), the smart hub can exchange the DTLS credentials (pre-shared symmetric keys or ECC public keys) with the computing device to complete the CoAP network key deployment. Another benefit of the approach is that at this step, the server has already verified that the smart hub and the computing device belong to the same user account. Accordingly, the smart hub can communicate with the server to transfer other user account related settings from the server to the computing device.

The access stage starts after the configuration stage and can include multiple steps. In a first step, the computing device disconnects from the smart hub's provisioning access point and connects to the home access point using the obtained Wi-Fi credentials. This step can include a Wi-Fi association and a Wi-Fi 4-way handshake. The smart hub removes the provisioning access point for the computing device. In another step, the computing device starts to access the secure computer network and other computer network through the home access point.

Figure 9:
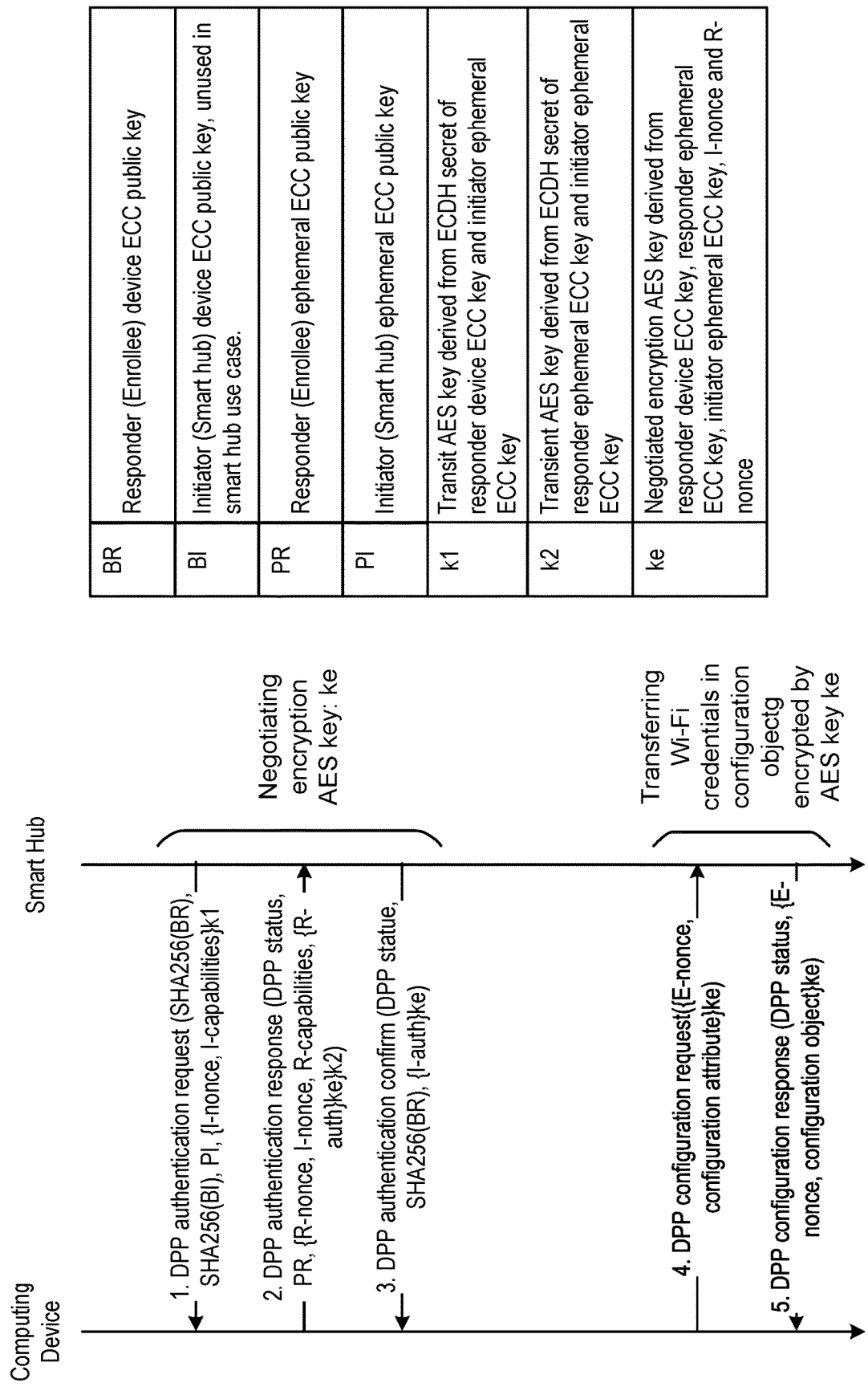
FIG. 9 illustrates an example of a sequence diagram for sending a credential of a secure computer network, according to an embodiment of the present disclosure.

FIG. 9 illustrates an example of a sequence diagram for sending a credential of a secure computer network, according to an embodiment of the present disclosure. In an example, the sequence diagram relies on the DPP protocol and can be implemented as sub-steps of the configuration stage described in connection with FIG. 8. As illustrated in FIG. 9, the smart hub sends a DPP authentication request according to the structure shown in FIG. 9. Next, the computing device responds with a DPP authentication response according to the structure shown in FIG. 9. In turn, the smart hub responds with a DPP authentication confirmation according to the structure shown in FIG. 9. These three steps represent a negotiation of encryption AES keys.

Next, the computing device sends a DPP configuration according to the structure shown in FIG. 9. In response, the smart hub sends a DPP configuration response according to the structure shown in FIG. 9. These two steps correspond to transferring Wi-Fi credentials in "configuration object," where this object can be encrypted by the AES keys.

Figure 10:
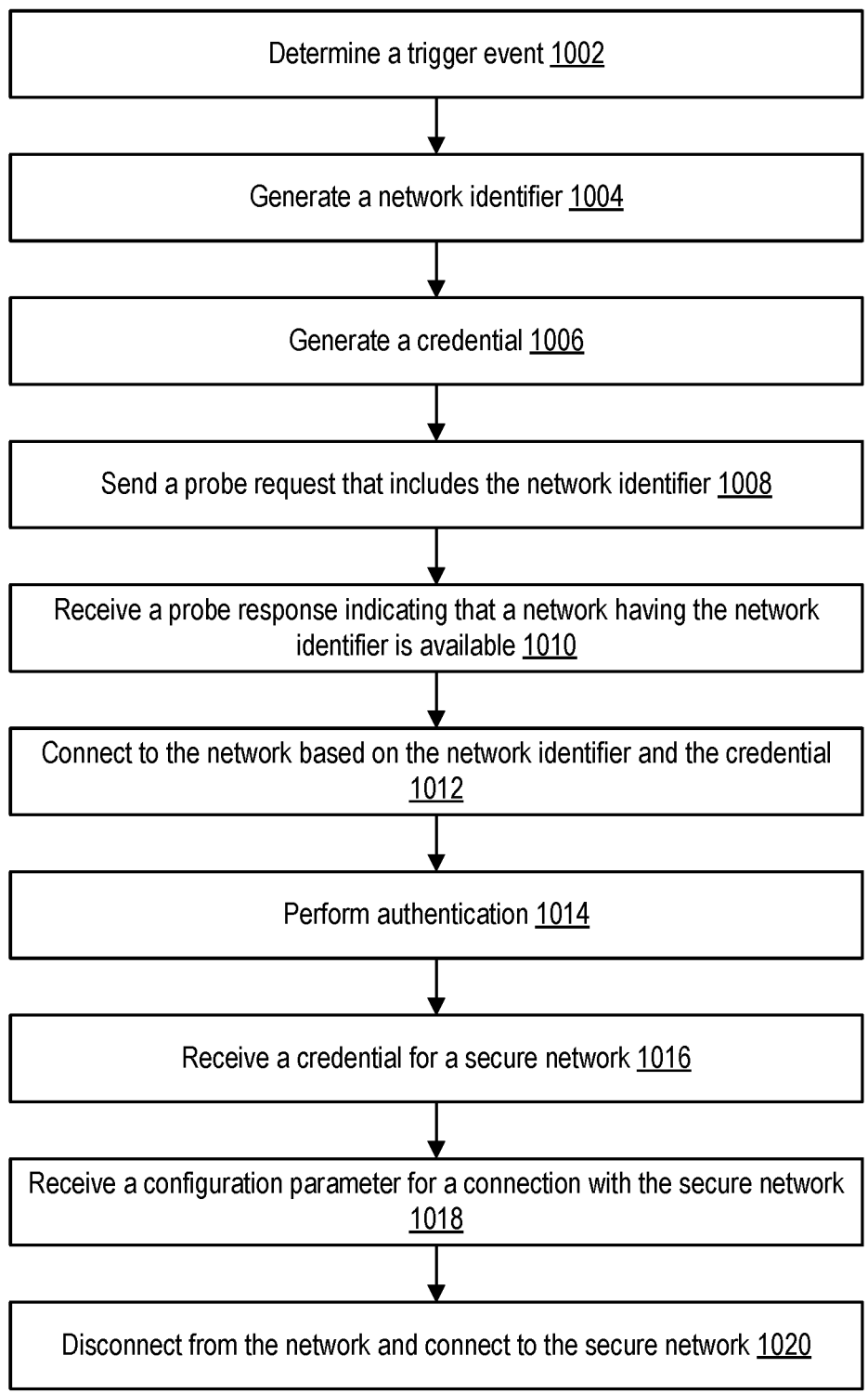
FIG. 10 illustrates an example of flow for a computing device to connect to a secure computer network, according to an embodiment of the present disclosure.
Figure 11:
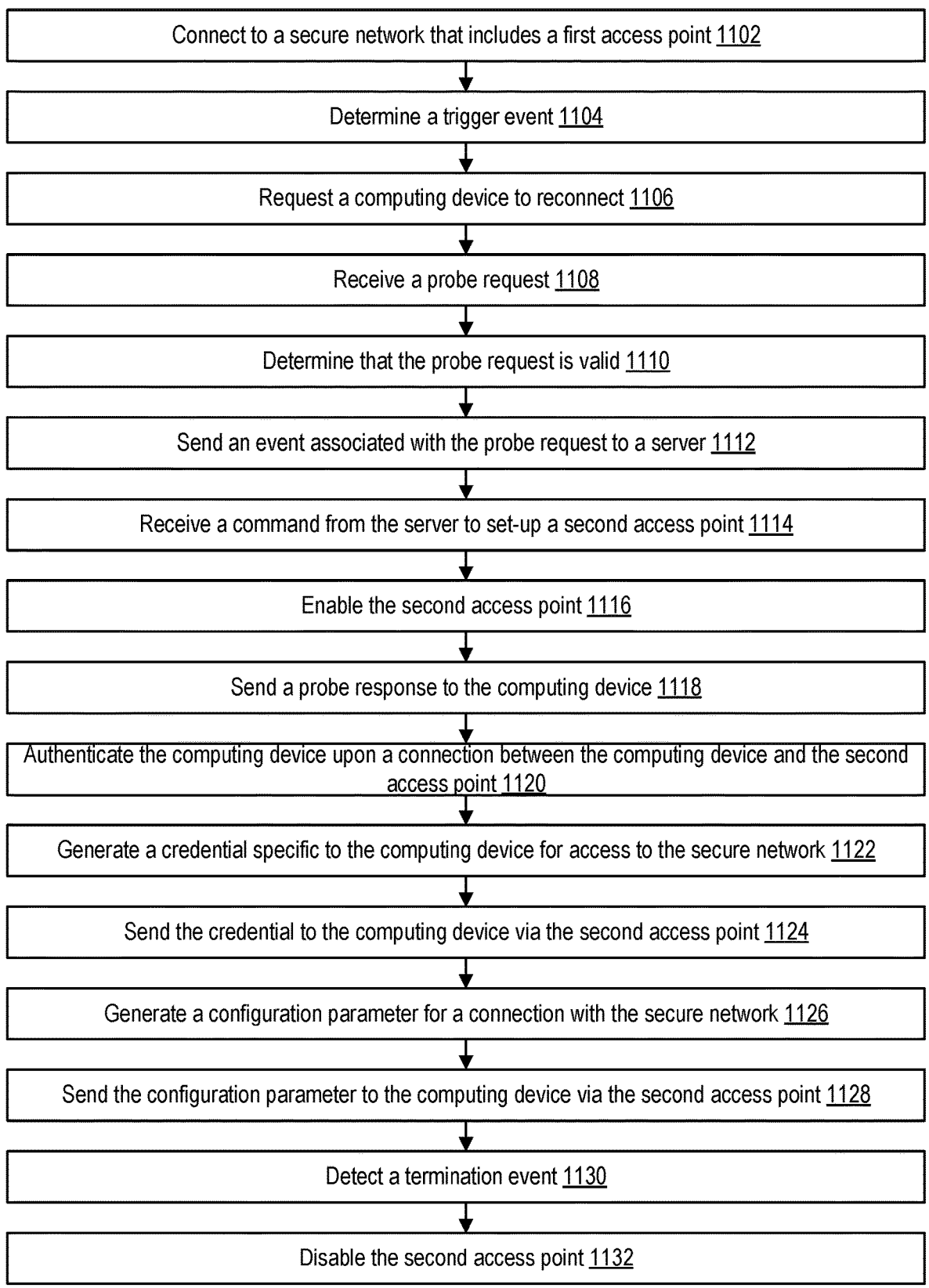
FIG. 11 illustrates an example of flow for a smart hub to manage a connection of a computing device to a secure computer network, according to an embodiment of the present disclosure.
Figure 12:
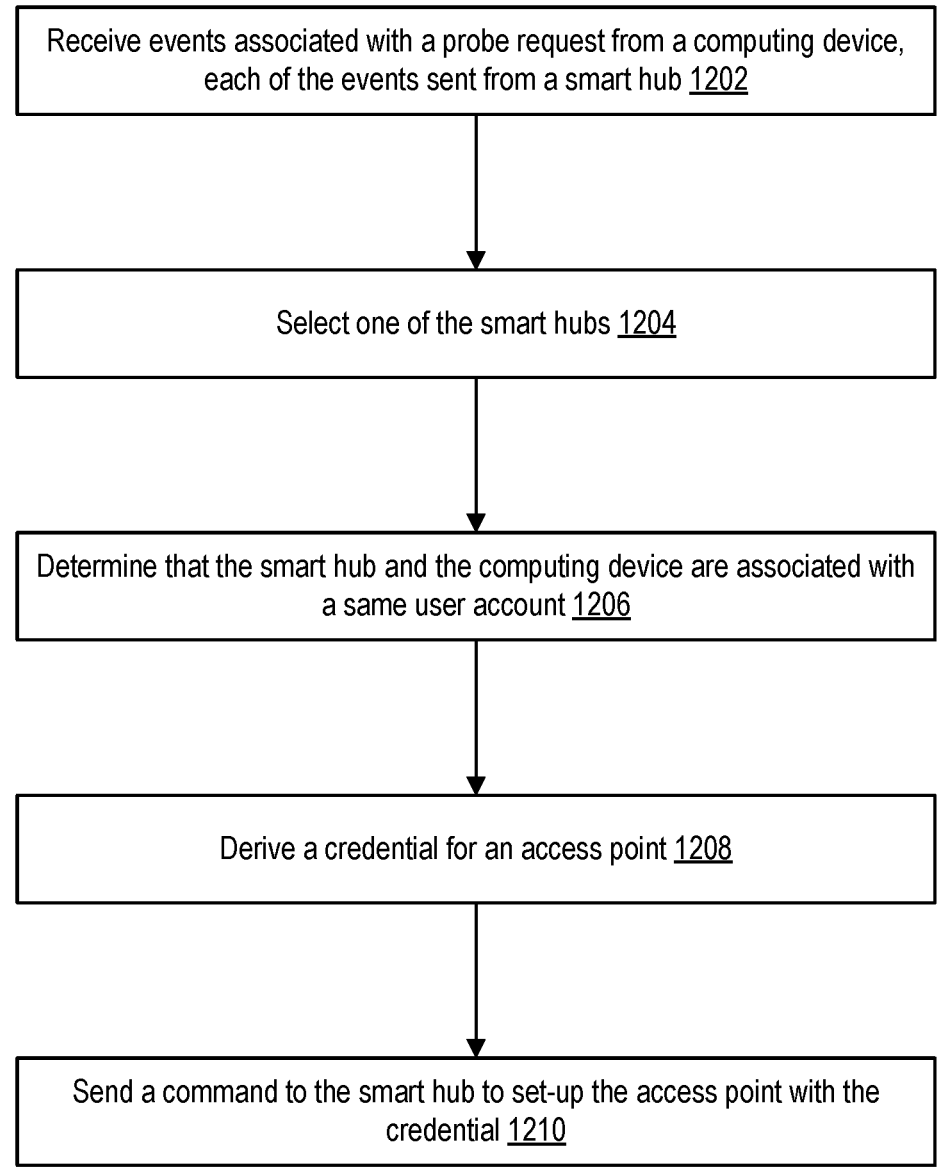
FIG. 12 illustrates an example of flow for a server to instruct a smart hub about managing a connection of a computing device to a secure computer network, according to an embodiment of the present disclosure.

FIGS. 10-12 illustrate example flows for connecting a computing device to a secure computer network. A computing device, similar to the one of FIG. 7, is described as performing operations of the example flow of FIG. 10, a smart hub, similar to the one of FIG. 6, is described as performing operations of the example flow of FIG. 12, and a server, similar to the one of FIG. 1, is described as performing operations of the example flow of FIG. 12. Instructions for performing the operations can be stored as computer-readable instructions on one or more non-transitory computer-readable media of the relevant computing component (e.g., the computing device for FIG. 10, the smart hub for FIG. 11, and the server for FIG. 12). As stored, the instructions represent programmable modules that include code executable by one or more processors of the relevant computing component. The execution of such instructions configures the relevant computing component to perform the specific operations shown in the corresponding figure and described herein. Each programmable module in combination with the respective processor(s) represents a means for performing a respective operation(s). While the operations are illustrated in a particular order, it should be understood that no particular order is necessary and that one or more operations may be omitted, skipped, and/or reordered.

FIG. 10 illustrates an example of flow for the computing device to connect to the secure computer network, according to an embodiment of the present disclosure. In an example, the flow can start at operation 1002, where the computing device determines a trigger event. Different examples of the trigger event are possible. For instance, the trigger event can be a power on for the first time, a connection failure following a previous connection to the secure home network, a command of the smart hub, or a time-based trigger (e.g., a schedule to rotate credentials).

At operation 1004, the computing device generates a network identifier. In an example, the network identifier is an SSID for a provisioning access point and is generated as an encoded SSID token that includes a field for a supported security protocol (e.g., supported WPA), a field for a device identifier of the computing device, and a field for a nonce generated by the computing device.

At operation 1006, the computing device generates a credential. In an example, the credential is a passphrase and is generated based on the nonce, a public key of the server, and a private key of the computing device.

At operation 1008, the computing device sends a probe request that includes the network identifier to the smart hub. In an example, the probe request is broadcasted and includes the encoded SSID token.

At operation 1010, the computing device receives a probe response indicating that a computer network having the network identifier is available. In an example, the probe response is received from the smart hub as a response to the probe request. The probe response can include the encoded SSID token and/or a confirmation that a provisioning access point was set-up using the requested SSID.

At operation 1012, the computing device connects to the computer network based on the network identifier and the credential. In an example, the computing device and the provisioning access point perform a Wi-Fi association based on the SSID and the passphrase.

At operation 1014, the computing device performs an authentication of the smart hub. In example, this authentication is based on a 4-way handshake.

At operation 1016, the computing device receives a credential for a secure computer network. For example, upon completion of the 4-way handshake, the smart hub generates the credential specifically for the computing device and sends the credential with instructions including an SSID of the secure computer network.

At operation 1018, the computing device receives a configuration parameter for a connection with the secure computer network. In an example, the configuration parameter includes any of an IP address, a default gateway, and/or a DNS configuration.

At operation 1020, the computing device disconnects from the computer network and connects to the secure computer network. In an example, the computing device disconnects from the provisioning access point and connects to the home access point by using the SSID and credential of the secure computer network. The connection can be set-up according to the configuration parameter upon mutual authentication.

FIG. 11 illustrates an example of flow for the smart hub to manage the connection of the computing device to the secure computer network, according to an embodiment of the present disclosure. In an example, the flow can start at operation 1102, where the smart hub connects to the secure computer network that includes the home access point (e.g., a first secure computer network and a first access point). Further, the smart hub can establish a TLS channel with the server.

At operation 1104, the smart hub determines a trigger event to reconnect a previously connected computing device to the secure computer network. Different examples of the trigger event are possible. For instance, the trigger event can be a connection failure following a previous connection to the secure home network or a time-based trigger (e.g., a schedule to rotate credentials).

At operation 1106, the smart hub requests a previously connected computing device to reconnect to the secure computer network. This request can cause the previously connected computing device to restart the enrollment process by sending a new Wi-Fi probe request, as illustrated in connection with FIG. 11. Alternatively, this request cause the previously connected computing device to request and receive a new credential for the connection to the home access point.

At operation 1108, the smart hub receives a probe request. This probe request can correspond to a previously connected computing device as described under operation 1106, or can correspond to a computing device attempting to connect to the secure computer network for the first time. The probe request can be broadcasted from the computing device and includes an encoded SSID token. Generally, the probe request includes first data identifying the computer network (e.g., a second secure computer network accessible via a second access point) to be established by the smart hub for the computing device.

At operation 1110, the smart hub determines that the probe request is valid. For example, the smart hub compares a security protocol (e.g., the WPA version) in the encoded SSID token to supported security protocol versions (e.g., supported WPA versions) and the total length of the encoded SSID token to an expected length. The probe request is validated if the security protocol version matches one of the supported security protocol versions and if the total length matches the expected length.

At operation 1112, the smart hub sends an event, such as a message, associated with the probe request to the server. In an example, the event includes the first data, such as the requested SSID (as an encoded SSID token). In addition, the event includes a device identifier of the computing device, such as the computing device's MAC address. Further, the event includes a value indicating a strength of a signal between the smart hub and the computing device. This value is usable by the server to select and send a response to the smart hub, as further described in connection with the next figure. In particular, in a case where multiple neighboring smart hubs exist, the signal strength is used by the server to select one of the smart hubs to proceed with establishing the connection.

At operation 1114, the smart hub receives a command from the server to set-up the second access point (e.g., the provisioning access point for the second secure computer network). The command can include a first credential associated with access to the second computer network. This credential can depend on the supported WAP protocol and includes, for instance, a first passphrase.

At operation 1116, the smart hub enables the second access point that is associated with the first credential (e.g., the passphrase). In an example, the second access point is a soft access point implemented in part as software code that manages access to the second secure computer network by necessitating the transmission of the SSID and the first credential from the computing device and verifying that the received SSID and first credential are valid. In this example, enabling the access point can include executing the software code.

At operation 1118, the smart hub sends a probe response to the computing device in response to the probe request. In an example, the probe response includes second data indicating that the access to the second secure computer network is available via the second access point.

At operation 1120, the smart hub authenticates the computing device upon a connection between the computing device and the second access point. In an example, the connection is a Wi-Fi connection established based on the SSID and the first credential (e.g., the passphrase).

At operation 1122, the smart hub generates a credential specific to the computing device for access to the secure computer network (e.g., the first secure computer network). In an example, this second credential is a per-client Wi-Fi credential that is generated based on one or more identifiers of the computing device, such as an IP address and a MAC address of the computing device.

At operation 1124, the smart hub sends the second credential to the computing device via the second access point. In an example, DPP over UDP can support this transmission.

At operation 1126, the smart hub generates a configuration parameter for the connection of the computing device with the secure computer network. In an example, the configuration parameter includes any of an IP address, a default gateway, and/or a DNS configuration.

At operation 1128, the smart hub sends the configuration parameter to the computing device via the second access point. At operation 1130, the smart hub detects a termination event. Different examples of the termination event are possible. The termination event can be that the second credential was sent via the second access point or a determination that the computing device connected to the first access point.

At operation 1132, the smart hub disables the second access point. In an example, the second access point is a soft access point that was set-up based on an execution of corresponding software code. The disabling here can include stopping the execution of the software code.

FIG. 12 illustrates an example of flow for the server to instruct the smart hub about managing the connection of the computing device to the secure computer network, according to an embodiment of the present disclosure. In an example, the flow can start at operation 1202, where the server receives events associated with a probe request that is broadcasted from the computing device. Each of the events can be sent from a smart hub in response to the smart hub receiving and verifying the probe request. The events can be received within a predefined time frame from each other (e.g., a five second time window). In an example, multiple smart hubs may be within a radio frequency (RF) transmission range of the computing device and, thus, each of these smart hubs may receive the broadcasted probe request.

At operation 1204, the server selects one of the smart hubs. In an example, different selection criteria are possible. For instance, the server selects the smart hub that is registered under the same user account as the computing device. If multiple smart hubs are registered under this user account, the sever can select the one that corresponds to the best signal strength.

At operation 1206, the server determines that the selected smart hub and the computing device are associated with a same user. This operation can be a sub-operation of operation 1204 when multiple events are received. Otherwise, the server determines whether the smart hub and the computing device are registered under the same user account by using an identifier of the smart hub and an identifier of the computing device to look up the user account and determine if this user account includes both identifiers.

At operation 1208, the server derives a credential for an access point (e.g., a provisioning access point). In an example, the server derives the credential (e.g., a passphrase) from a nonce included in the probe request, the server's private key, and the computing device's public key.

At operation 1210, the server sends a command to the smart hub to set-up the provisioning access point with the credential. In an example, the command includes the credential and the SSID.

Figure 13:
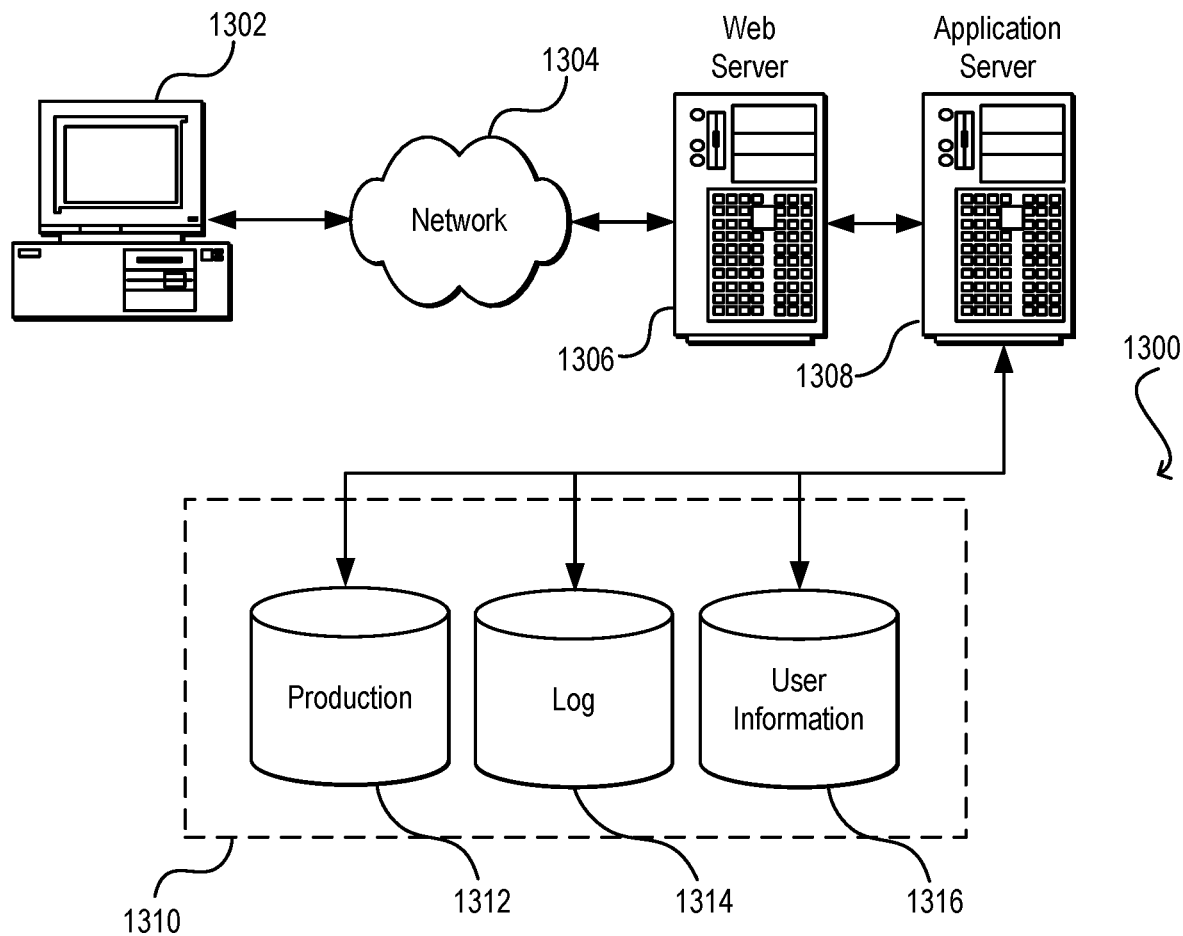
FIG. 13 illustrates a computer architecture diagram showing an example computer architecture, according to an embodiment of the present disclosure.

FIG. 13 illustrates a computer architecture diagram showing an example computer architecture, according to an embodiment of the present disclosure. This architecture may be used to implement some or all of the systems described herein. The computer architecture shown in FIG. 13 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein.

The computer 1300 includes a baseboard 1302, or "motherboard," which is a printed circuit board to which a multitude of components or devices may be connected by way of a system bus or other electrical communication paths. In one illustrative embodiment, one or more central processing units ("CPUs") 1304 operate in conjunction with a chipset 1306. The CPUs 1304 may be standard programmable processors that perform arithmetic and logical operations necessary for the operation of the computer 1300.

The CPUs 1304 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1306 provides an interface between the CPUs 1304 and the remainder of the components and devices on the baseboard 1302. The chipset 1306 may provide an interface to a random access memory ("RAM") 1308, used as the main memory in the computer 1300. The chipset 1306 may further provide an interface to a computer-readable storage medium such as a read-only memory ("ROM") 1310 or non-volatile RAM ("NVRAM") for storing basic routines that help to startup the computer 1300 and to transfer information between the various components and devices. The ROM 1310 or NVRAM may also store other software components necessary for the operation of the computer 1300 in accordance with the embodiments described herein.

The computer 1300 may operate in a networked environment using logical connections to remote computing devices and computer systems through a network, such as the local area network 1320. The chipset 1306 may include functionality for providing network connectivity through a NIC 1312, such as a gigabit Ethernet adapter. The NIC 1312 is capable of connecting the computer 1300 to other computing devices over the network 1320. It should be appreciated that multiple NICs 1312 may be present in the computer 1300, connecting the computer to other types of networks and remote computer systems.

The computer 1300 may be connected to a mass storage device 1318 that provides non-volatile storage for the computer. The mass storage device 1318 may store system programs, application programs, other program modules, and data, which have been described in greater detail herein. The mass storage device 1318 may be connected to the computer 1300 through a storage controller 1314 connected to the chipset 1306. The mass storage device 1318 may consist of one or more physical storage units. The storage controller 1314 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1300 may store data on the mass storage device 1318 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1318 is characterized as primary or secondary storage, and the like.

For example, the computer 1300 may store information to the mass storage device 1318 by issuing instructions through the storage controller 1314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1300 may further read information from the mass storage device 1318 by detecting the physical states or characteristics of one or more particular locations within the physical storage units.

In addition to the mass storage device 1318 described above, the computer 1300 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1300.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1318 may store an operating system 1330 utilized to control the operation of the computer 1300. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1318 may store other system or application programs and data utilized by the computer 1300. The mass storage device 1318 might also store other programs and data not specifically identified herein.

In one embodiment, the mass storage device 1318 or other computer-readable storage media is encoded with computer-executable instructions which, when loaded into the computer 1300, transforms the computer from a general-purpose computing system into a special-purpose computer capable of implementing the embodiments described herein. These computer-executable instructions transform the computer 1300 by specifying how the CPUs 1304 transition between states, as described above. According to one embodiment, the computer 1300 has access to computer-readable storage media storing computer-executable instructions which, when executed by the computer 1300, perform the various routines described above. The computer 1300 might also include computer-readable storage media for performing any of the other computer-implemented operations described herein.

The computer 1300 may also include one or more input/output controllers 1316 for receiving and processing input from a number of input devices, such as a keyboard, a mouse, a touchpad, a touch screen, an electronic stylus, or other type of input device. Similarly, the input/output controller 1316 may provide output to a display, such as a computer monitor, a flat-panel display, a digital projector, a printer, a plotter, or other type of output device. It will be appreciated that the computer 1300 may not include all of the components shown in FIG. 13, may include other components that are not explicitly shown in FIG. 13, or may utilize an architecture completely different than that shown in FIG. 13. It should also be appreciated that many computers, such as the computer 1300, might be utilized in combination to embody aspects of the various technologies disclosed herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for managing access to a home local area network (LAN) via a home access point (AP), the computer-implemented method comprising:
    establishing, by a network hub, a data connection to the home AP;
    receiving, by the network hub, a Wi-Fi probe request from a computing device, the Wi-Fi probe request comprising a service set identifier (SSID) for a temporary LAN to be established by the network hub for the computing device;
    sending, by the network hub to a server over a secure channel, a message that includes the SSID;
    receiving, by the network hub from the server over the secure channel, a passphrase for the temporary LAN in response to the message;
    enabling, by the network hub, a provisioning AP that controls access to associated with the temporary LAN based on the SSID and the passphrase;
    sending, by the network hub to the computing device, a Wi-Fi probe response indicating that the provisioning AP is available to the computing device;
    authenticating, by the network hub based on a Wi-Fi four-way handshake, the computing device in response to a Wi-Fi association between the computing device and the provisioning AP, the Wi-Fi association established based on the SSID and the passphrase;
    generating, by the network hub, a credential specific to the computing device;
    sending, by the network hub, the credential to the computing device via the provisioning AP, wherein the credential allows the computing device to connect to the home AP; and
    disabling, by the network hub after the credential is sent to the computing device, the provisioning AP such that access to the temporary LAN is terminated.

2. The computer-implemented method of claim 1, wherein the SSID in the Wi-Fi probe request comprises a first identifier of a security protocol version supported by the computing device, a hash code derived from a public key of the computing device, and a nonce, and wherein the message sent from the network hub to the server further comprises a medium access control (MAC) address of the computing device.

3. The computer-implemented method of claim 2, further comprising:
    determining, by the network hub, the security protocol version from the SSID and a total length of the SSID;
    determining, by the network hub, that the Wi-Fi probe request is valid by at least comparing the security protocol version to supported security protocol versions and the total length to an expected length; and
    generating the message based on the Wi-Fi probe request being valid.

4. A network access device comprising:
    one or more processors; and
    one or more non-transitory computer-readable storage media storing instructions that, upon execution by the one or more processors, configure the network access device to:
        connect to a first access point, the first access point being part of a first network;
        receive, from a computing device, first data identifying a second network;
        send the first data to a server;
        receive, from the server, a first credential associated with access to the second network;
        enable a second access point based on the first data, the second access point associated with the first credential and configured to control access to the second network;
        generate a second credential associated with access to the first network via the first access point;
        send the second credential to the computing device via the second access point; and
        disable the second access point based at least in part on the second credential being sent such that access to the second network is terminated.

5. The network access device of claim 4, wherein the network access device comprises the first access point and the second access point.

6. The network access device of claim 4, wherein the first data is sent in a message, wherein the one more non-transitory computer-readable storage media store further instructions that, upon execution by the one or more processors, configure the network access device to:
    include, in the message, a value indicating a strength of a signal between the network access device and the computing device, wherein the first credential is received based on the value.

7. The network access device of claim 4, wherein the one more non-transitory computer-readable storage media store further instructions that, upon execution by the one or more processors, configure the network access device to:
    send, to the computing device via the second access point, a configuration parameter associated with the first network.

8. The network access device of claim 4, wherein the one more non-transitory computer-readable storage media store further instructions that, upon execution by the one or more processors, configure the network access device to:
    determine whether the first data is valid based at least in part on a data structure of the first data.

9. The network access device of claim 8, wherein sending the first data comprises:
    sending, to the server based at least in part on the first data being valid, a message that comprises a network address of the computing device and an identifier of the second network.

10. The network access device of claim 4, wherein the one more non-transitory computer-readable storage media store further instructions that, upon execution by the one or more processors, configure the network access device to:
  restrict access of the computing device to the first network via the second access point.

11. The network access device of claim 4, wherein the second access point is disabled further based at least in part on a determination that the computing device is connected to the first access point.

12. A computer system comprising:
  a network access device that comprises one or more processors and one or more non-transitory computer-readable storage media storing instructions that, upon execution by the one or more processors, configure the network access device to:
    connect to a first access point, the first access point being part of a first network;
    receive, from a computing device, first data identifying a second network;
    send the first data to a server;
    receive, from the server, a first credential associated with access to the second network;
    enable a second access point based on the first data, the second access point associated with the first credential and configured to control access to the second network;
    generate a second credential associated with access to the first network via the first access point; and
    send the second credential to the computing device via the second access point disable the second access point based at least in part on the second credential being sent such that access to the second network is terminated.

13. The computer system of claim 12, further comprising the server, wherein the server is configured to:
  determine whether the network access device and the computing device are registered under a same user account; and
  send the first credential to the network access device based on a determination that the network access device and the computing device are registered under the same user account.

14. The computer system of claim 13, further comprising the computing device, wherein:
  the computing device is configured to store a public key of the server and to generate the first credential based on a private key of the computing device, the public key of the server, and a nonce;
  the first data comprises the nonce and an identifier of the computing device; and
  the server is configured to access a public key of the computing device based on the identifier of the computing device and to generate the first credential based on a private key of the server, the public key of the computing device, and the nonce.

15. The computer system of claim 12, wherein the second access point is enabled with the first credential for a network address of the computing device.

16. The computer system of claim 15, wherein the second credential is specific to the computing device and is generated based on the network address of the computing device.

17. The computer system of claim 16, wherein the one or more non-transitory computer-readable storage media store further instructions that, upon execution by the one or more processors, configure the network access device to:
  enable, for a second computing device and based on a second network address of the second computing device, a third access point to a third secure network; and
  generate, for the second computing device and based on the second network address of the second computing device, a third credential associated with access of the second computing device to the first network via the first access point.

18. The computer system of claim 12, wherein the one or more non-transitory computer-readable storage media store further instructions that, upon execution by the one or more processors, configure the network access device to:
  determine, based a connection between the computing device and the second access point, that the computing device supports a Wi-Fi protected access (WPA) personal protocol, wherein the second credential comprises a passphrase based at least in part on the WPA personal protocol.

19. The computer system of claim 12, wherein the one or more non-transitory computer-readable storage media store further instructions that, upon execution by the one or more processors, configure the network access device to:
  determine, based a connection between the computing device and the second access point, that the computing device supports a Wi-Fi protected access (WPA) enterprise protocol, wherein the second credential comprises a certificate based at least in part on the WPA enterprise protocol.

20. The computer system of claim 12, wherein the one or more non-transitory computer-readable storage media store further instructions that, upon execution by the one or more processors, configure the network access device to:
  invalidate the second credential based on an invalidation trigger event, wherein the invalidating causes the computing device to disconnect from the first network and at least one of: request access to a third network or request a third credential associated with the access to the first network.

* * * * *